United States Patent
Wang et al.

(10) Patent No.: US 12,464,427 B2
(45) Date of Patent: Nov. 4, 2025

(54) CELL MEASUREMENT METHOD AND RELATED APPARATUS

(71) Applicant: HUAWEI TECHNOLOGIES CO., LTD., Shenzhen (CN)

(72) Inventors: Yanchun Wang, Shenzhen (CN); Quan Zhou, Shanghai (CN); Guojun Yue, Shanghai (CN)

(73) Assignee: Huawei Technologies Co., Ltd, Shenzhen (CN)

(*) Notice: Subject to any disclaimer, the term of this patent is extended or adjusted under 35 U.S.C. 154(b) by 350 days.

(21) Appl. No.: 18/325,793

(22) Filed: May 30, 2023

(65) Prior Publication Data
US 2023/0300701 A1 Sep. 21, 2023

Related U.S. Application Data

(63) Continuation of application No. PCT/CN2020/132936, filed on Nov. 30, 2020.

(51) Int. Cl.
*H04W 36/08* (2009.01)
*H04W 36/00* (2009.01)

(52) U.S. Cl.
CPC ....... *H04W 36/08* (2013.01); *H04W 36/0085* (2018.08); *H04W 36/13* (2023.05)

(58) Field of Classification Search
CPC .. H04W 36/08; H04W 36/0085; H04W 36/13
See application file for complete search history.

(56) References Cited

U.S. PATENT DOCUMENTS

2015/0215905 A1 7/2015 Park et al.

OTHER PUBLICATIONS

"CSI-RS based RRM measurement for L3 mobility," 3GPP TSG RAN WG1 Meeting #90, Prague, Czech Republic, R1-1713133, total 8 pages, R3GPP—3rd Generation Partnership Project, Valbonne, France (Aug. 21-25, 2017).

*Primary Examiner* — Justin Y Lee
(74) *Attorney, Agent, or Firm* — Leydig, Voit & Mayer, Ltd.

(57) ABSTRACT

A cell measurement method and a related apparatus are provided. The method includes: a first access network device sends to a terminal device, through a first serving cell, first measurement control information indicating the terminal device to measure quality of a downlink reference signal of a virtual cell; receives a report regarding the quality; and migrates the terminal device to a third serving cell when the quality of the downlink reference signal of the virtual cell is higher than the one of the first serving cell. A center frequency of a downlink reference signal of the first serving cell is the same as the one of the virtual cell, a frequency range of the virtual cell is included in a frequency range of a second serving cell which overlaps with a frequency range of the first serving cell. Near-far interference to the terminal device is avoided.

20 Claims, 15 Drawing Sheets

LTE cell

LTE cell and NR cell (supporting DSS)

LTE cell

NR cell

Disable some LTE networks

LTE cell and NR cell (supporting DSS)

NR cell

CELL MEASUREMENT METHOD AND RELATED APPARATUS

CROSS-REFERENCE TO RELATED APPLICATIONS

This application is a continuation of International Application No. PCT/CN2020/132936, filed on Nov. 30, 2020, the disclosure of which is hereby incorporated by reference in its entirety.

TECHNICAL FIELD

Embodiments of this application relate to the field of mobile communication technologies, and in particular, to a cell measurement method and a related apparatus.

BACKGROUND

As mobile communication technologies develop, coverage of a new radio (NR) mobile communication technology is expanding gradually. A long term evolution (LTE) technology and an NR technology coexist in a communication network.

In some application scenarios, in a same frequency band, two neighboring cells may support different standards. In LTE and NR communication systems, intra-frequency measurement and handover in a same communication standard are performed to ensure that a mobile terminal can always be in a cell with a strongest signal in the same communication standard, and the terminal device cannot perform inter-standard intra-frequency measurement without additional power consumption.

When a neighboring cell signal sent by a neighboring inter-standard intra-frequency cell is stronger than a service signal provided by a serving cell, the neighboring cell signal causes strong interference to the service signal received by the terminal device. In addition, to ensure that the serving cell can normally receive an uplink signal sent by the terminal device, the terminal device increases power of a transmit signal of the terminal device. In this case, the uplink signal sent by the terminal device interferes with an uplink signal sent by another terminal device in the serving cell. The foregoing case is referred to as near-far interference. How to avoid near-far interference to the terminal device in intra-frequency inter-standard networking is a problem to be urgently resolved by a person skilled in the art.

SUMMARY

This application provides a cell measurement method and a related apparatus, to avoid near-far interference to a terminal device.

According to a first aspect, this application provides a cell measurement method. The method includes: A first access network device sends first measurement control information to a terminal device through a first serving cell. The first measurement control information indicates the terminal device to measure quality of a downlink reference signal of a virtual cell. A center frequency of a downlink reference signal of the first serving cell is the same as a center frequency of the downlink reference signal of the virtual cell, a frequency range of the virtual cell is included in a frequency range of a second serving cell, and the frequency range of the second serving cell overlaps with a frequency range of the first serving cell. The first access network device receives a first measurement report from the terminal device, where the first measurement report indicates the quality of the downlink reference signal of the virtual cell. The first access network device migrates the terminal device to a third serving cell when the quality of the downlink reference signal of the virtual cell is higher than quality of the downlink reference signal of the first serving cell. A standard of the second serving cell is different from a standard of the first serving cell, or a standard of the second serving cell is the same as a standard of the first serving cell and a center frequency of a downlink reference signal of the second serving cell is different from the center frequency of the downlink reference signal of the first serving cell. The virtual cell and the second serving cell are cells of the first access network device, or the virtual cell and the second serving cell are cells of a second access network device. A standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell. Near-far interference to the terminal device can be avoided by using the method.

With reference to the first aspect, in a possible implementation, that the first access network device migrates the terminal device to a third serving cell includes: The first access network device sends second measurement control information to the terminal device, where the second measurement control information indicates the terminal device to measure quality of the downlink reference signal of the third serving cell. The first access network device receives a second measurement report from the terminal device, where the second measurement report indicates the quality of the downlink reference signal of the third serving cell. The first access network device migrates the terminal device to the third serving cell based on the second measurement report.

With reference to the first aspect, in a possible implementation, the first access network device stores one or more cell identifiers of one or more serving cells neighboring to the first serving cell. The cell identifiers of the one or more serving cells include a cell identifier of the third serving cell. That the first access network device migrates the terminal device to a third serving cell includes: The first access network device selects the third serving cell from the one or more stored serving cells neighboring to the first serving cell; and the first access network device migrates the terminal device to the third serving cell.

With reference to the first aspect, in a possible implementation, the first access network device stores a cell identifier of the virtual cell, and a first measurement result includes the cell identifier of the virtual cell.

With reference to the first aspect, in a possible implementation, the first access network device stores the cell identifiers of the one or more serving cells neighboring to the first serving cell, a first measurement result includes a cell identifier of the virtual cell, and the cell identifier of the virtual cell is different from the cell identifiers of the one or more serving cells.

With reference to the first aspect, in a possible implementation, the virtual cell does not provide an access service for the terminal device.

With reference to the first aspect, in a possible implementation, that a standard of the second serving cell is different from a standard of the first serving cell includes: The standard supported by the first serving cell is a long term evolution LTE standard, and the standard supported by the second serving cell is a new radio NR standard; or the standard supported by the first serving cell is an NR standard, and the standard supported by the second serving cell is an LTE standard.

With reference to the first aspect, in a possible implementation, the virtual cell and the second serving cell are the cells of the first access network device, and the method further includes: The first access network device sends a downlink signal of the virtual cell, where the downlink signal includes the downlink reference signal of the virtual cell.

With reference to the first aspect, in a possible implementation, the downlink reference signal includes a cell-specific reference signal CRS.

With reference to the first aspect, in a possible implementation, the downlink signal further includes one or more of a primary synchronization signal PSS, a secondary synchronization signal SSS, and a system information block, and the system information block includes indication information indicating that the virtual cell does not provide an access service for the terminal device.

With reference to the first aspect, in a possible implementation, the downlink reference signal is a demodulation reference signal DMRS, the downlink signal is a synchronization signal and physical broadcast channel block SSB, and the SSB includes the DMRS.

With reference to the first aspect, in a possible implementation, the method further includes: The first access network device sends, through the second serving cell, indication information to a terminal device accessing the second serving cell. The indication information indicates an available time-frequency resource of the terminal device accessing the second serving cell, and the available time-frequency resource is different from a time-frequency resource occupied by the downlink signal of the virtual cell or indicates that the terminal device accessing the second serving cell does not use a time-frequency resource occupied by the downlink signal sent by the virtual cell.

According to a second aspect, embodiments of this application provide a communication apparatus, where the communication apparatus includes a sending unit, a receiving unit, and a migration unit. The sending unit is configured to send first measurement control information to a terminal device through a first serving cell. The first measurement control information indicates the terminal device to measure quality of a downlink reference signal of a virtual cell. A center frequency of a downlink reference signal of the first serving cell is the same as a center frequency of the downlink reference signal of the virtual cell. A frequency range of the virtual cell is included in a frequency range of a second serving cell, and the frequency range of the second serving cell overlaps with a frequency range of the first serving cell. A standard of the second serving cell is different from a standard of the first serving cell, or a standard of the second serving cell is the same as a standard of the first serving cell and a center frequency of a downlink reference signal of the second serving cell is different from the center frequency of the downlink reference signal of the first serving cell. The virtual cell and the second serving cell are cells of a first access network device, or the virtual cell and the second serving cell are cells of a second access network device. The receiving unit is configured to receive a first measurement report from the terminal device, where the first measurement report indicates the quality of the downlink reference signal of the virtual cell. The migration unit is configured to migrate the terminal device to a third serving cell when the quality of the downlink reference signal of the virtual cell is higher than quality of the downlink reference signal of the first serving cell. A standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell.

With reference to the second aspect, in a possible implementation, the migration unit is specifically configured to: send second measurement control information to the terminal device, where the second measurement control information indicates the terminal device to measure quality of the downlink reference signal of the third serving cell; receive a second measurement report from the terminal device, where the second measurement report indicates the quality of the downlink reference signal of the third serving cell; and migrate the terminal device to the third serving cell based on the second measurement report.

With reference to the second aspect, in a possible implementation, the first access network device stores one or more cell identifiers of one or more serving cells neighboring to the first serving cell. The cell identifiers of the one or more serving cells include a cell identifier of the third serving cell. The migration unit is specifically configured to: select the third serving cell from the one or more stored serving cells neighboring to the first serving cell; and migrate the terminal device to the third serving cell.

With reference to the second aspect, in a possible implementation, the first access network device stores a cell identifier of the virtual cell, and a first measurement result includes the cell identifier of the virtual cell.

With reference to the second aspect, in a possible implementation, the first access network device stores the cell identifiers of the one or more serving cells neighboring to the first serving cell, a first measurement result includes a cell identifier of the virtual cell, and the cell identifier of the virtual cell is different from the cell identifiers of the one or more serving cells.

With reference to the second aspect, in a possible implementation, the virtual cell does not provide an access service for the terminal device.

With reference to the second aspect, in a possible implementation, that a standard of the second serving cell is different from a standard of the first serving cell includes: The standard supported by the first serving cell is a long term evolution LTE standard, and the standard supported by the second serving cell is a new radio NR standard; or the standard supported by the first serving cell is an NR standard, and the standard supported by the second serving cell is an LTE standard.

With reference to the second aspect, in a possible implementation, the virtual cell and the second serving cell are the cells of the first access network device, and the sending unit is further configured to send a downlink signal of the virtual cell, where the downlink signal includes the downlink reference signal of the virtual cell.

With reference to the second aspect, in a possible implementation, the downlink reference signal includes a cell-specific reference signal CRS.

With reference to the second aspect, in a possible implementation, the downlink signal further includes one or more of a PSS, an SSS, and a system information block, and the system information block includes indication information indicating that the virtual cell does not provide an access service for the terminal device.

With reference to the second aspect, in a possible implementation, the downlink reference signal is a DMRS, the downlink signal is an SSB, and the SSB includes the DMRS.

With reference to the second aspect, in a possible implementation, the sending unit is further configured to send, through the second serving cell, indication information to a terminal device accessing the second serving cell. The indication information indicates an available time-frequency resource of the terminal device accessing the second serving cell, and the available time-frequency resource is different from a time-frequency resource occupied by the downlink signal of the virtual cell or indicates that the terminal device accessing the second serving cell does not use a time-frequency resource occupied by the downlink signal sent by the virtual cell.

According to a third aspect, embodiments of this application provide a communication apparatus. The communication apparatus includes a processor, and the processor is coupled to a memory. The memory is configured to store program code. The processor is configured to invoke the program code from the memory to perform the method described in any one of the first aspect or the possible implementations of the first aspect.

According to a fourth aspect, embodiments of this application provide a computer-readable storage medium. The computer-readable storage medium is configured to store instructions, and when the instructions are executed, the method described in any one of the first aspect or the possible implementations of the first aspect is implemented.

According to a fifth aspect, embodiments of this application provide a chip system. The chip system includes at least one processor and an interface, and is configured to support a first access network device in implementing a function in the first aspect, for example, receiving or processing data and/or information in the foregoing method. In a possible design, the chip system further includes a memory, and the memory is configured to store program instructions and data that are necessary for the first access network device. The chip system may include a chip, or may include a chip and another discrete component.

In embodiments of this application, the first access network device may determine, based on the first measurement report, that the quality of the downlink reference signal of the virtual cell is higher than the quality of the downlink reference signal of the first serving cell. In this case, near-far interference may be caused. In this case, the first access network device migrates the terminal device to the third serving cell, to avoid near-far interference to the terminal device.

BRIEF DESCRIPTION OF DRAWINGS

To describe technical solutions in embodiments of this application more clearly, the following briefly introduces the accompanying drawings for describing embodiments. It is clear that the accompanying drawings in the following descriptions show merely some embodiments of this application, and a person of ordinary skill in the art may still derive other drawings from these accompanying drawings without creative efforts.

DESCRIPTION OF EMBODIMENTS

The following describes in detail technical solutions in embodiments of this application.

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

It should be further understood that, "first", "second", "third", "fourth", and various numbers in this specification are merely used for differentiation for ease of description, and are not intended to limit the scope of embodiments of this application.

Figure 1A:
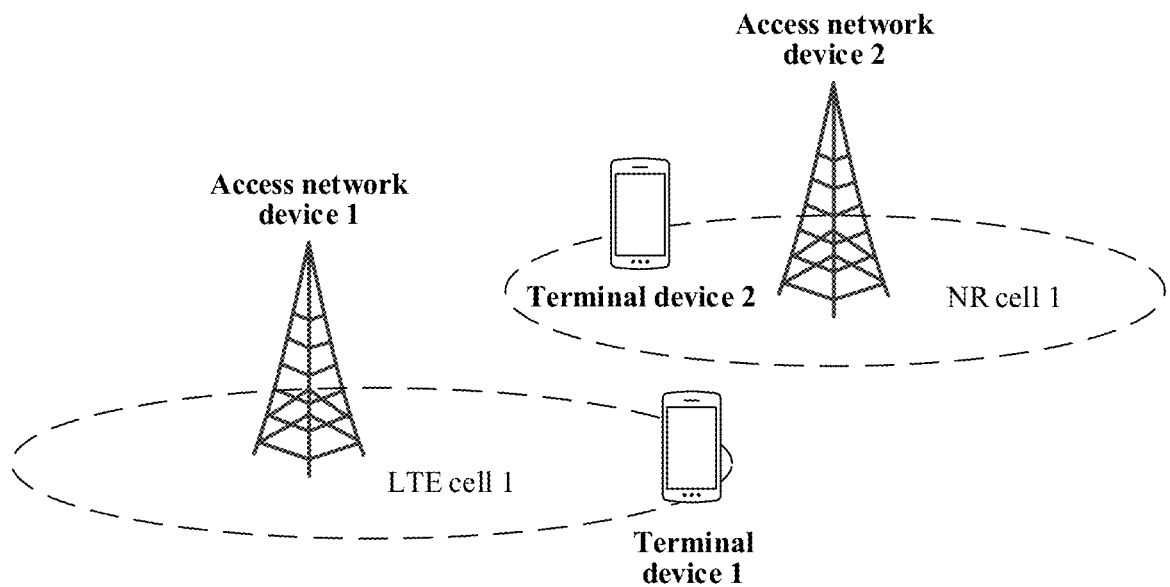
FIG. 1A and FIG. 1B are schematic diagrams of some network architectures according to embodiments of this application.

Embodiments of this application may be applied to a network architecture shown in FIG. 1A. The network architecture shown in FIG. 1A is a network architecture of a wireless communication system. The network architecture usually includes a terminal device and an access network device. A quantity of each type of devices and a form of each type of devices do not constitute a limitation on embodiments of this application. FIG. 1A includes an access network device 1, an access network device 2, and one or more terminal devices (where a terminal device 1 and a terminal device 2 are used as examples in the figure, the terminal device 1 is camped on an LTE cell 1, and the terminal device 2 is camped on an NR cell 1). Specifically, the LTE cell 1 corresponds to the access network device 1. This may be understood as that the access network device 1 provides the LTE cell 1, and provides a communication service for the terminal device 1 through the LTE cell 1. The NR cell 1 corresponds to the access network device 2. This may be understood as that the access network device 2 provides the NR cell 1, and provides a communication service for the terminal device 2 through the NR cell 1. A dashed line in FIG. 1A represents a coverage area of a cell. For a same mark in the following figures, refer to the description. An LTE cell is a cell using an LTE communication standard, and an NR cell is a cell using an NR communication standard. A frequency range of the LTE cell 1 and a frequency range of the NR cell 1 overlap.

In a system shown in FIG. 1A, the access network device 1 may send, through the LTE cell 1, a signal to one or more terminal devices (for example, the terminal device 1) camped on the LTE cell 1, and the access network device 2 may send, through the NR cell 1, a signal to one or more terminal devices (for example, the terminal device 2) camped on the NR cell 1. When the access network device 2 sends a signal to the terminal device 2 through the NR cell 1, the terminal device 1 may receive the signal sent by the access network device 2. The signal causes interference to communication between the terminal device 1 and the access network device 1. Therefore, the signal may be considered as an interference signal. In addition, to ensure that the access network device 1 can normally receive an uplink signal sent by the terminal device 1, the terminal device 1 increases power of a transmit signal of the terminal device 1. In this case, the uplink signal sent by the terminal device interferes with an uplink signal sent by another terminal device in the LTE cell 1.

Figure 1B:
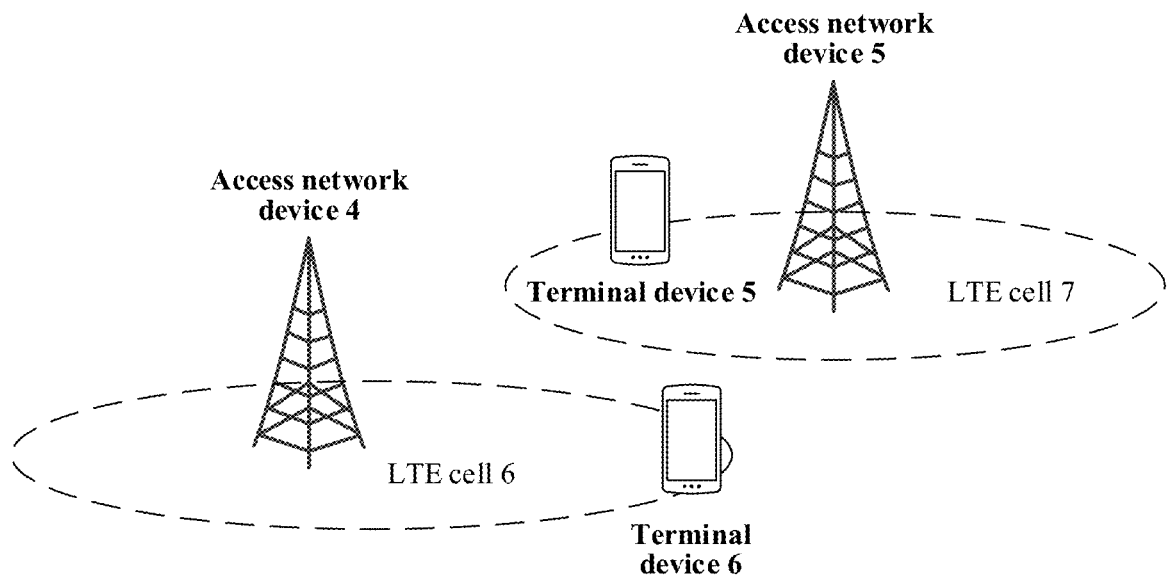

FIG. 1B is a schematic diagram of another network architecture according to an embodiment of this application. FIG. 1B includes an access network device 4, an access network device 5, and one or more terminal devices (where a terminal device 6 and a terminal device 5 are used as examples in the figure, the terminal device 6 is camped on an LTE cell 6, and the terminal device 5 is camped on an LTE cell 7). Specifically, the LTE cell 6 corresponds to the access network device 4. This may be understood as that the access network device 4 provides the LTE cell 6, and provides a communication service for the terminal device 6 through the LTE cell 6. The LTE cell 7 corresponds to the access network device 5. This may be understood as that the access network device 5 provides the LTE cell 7, and provides a communication service for the terminal device 5 through the LTE cell 7. Optionally, the LTE cell 6 and the LTE cell 7 are cells of a same standard, but a center frequency of a downlink reference signal of the LTE cell 6 is different from a center frequency of a downlink reference signal of the LTE cell 7, and a frequency range of the LTE cell 6 and a frequency range of the LTE cell 7 overlap. For example, the frequency range of the LTE cell 6 is 2010 MHz to 2020 MHz, and the center frequency of the downlink reference signal of the LTE cell 6 is 2015 MHz; and the frequency range of the LTE cell 7 is 2010 MHz to 2040 MHz, and the center frequency of the downlink reference signal of the LTE cell 7 is 2020 MHz. It should be noted that, in embodiments of this application, cells that have a same standard but different center frequencies of downlink reference signals may be referred to as intra-standard inter-frequency cells. In other words, the LTE cell 6 and the LTE cell 7 are intra-standard inter-frequency cells. Two cells that have a same center frequency of a downlink reference signal may be referred to as intra-frequency cells.

In a system shown in FIG. 1B, the access network device 4 may send, through the LTE cell 6, a signal to one or more terminal devices (for example, the terminal device 6) camped on the LTE cell 6, and the access network device 5 may send, through the LTE cell 7, a signal to one or more terminal devices (for example, the terminal device 5) camped on the LTE cell 7. When the access network device 5 sends a signal to the terminal device 5 through the LTE cell 7, because the frequency range of the LTE cell 6 overlaps with the frequency range of the LTE cell 7, the terminal device 6 may receive the signal sent by the access network device 5. The signal causes interference to communication between the terminal device 6 and the access network device 4. Therefore, the signal may be considered as an interference signal. In addition, to ensure that the access network device 4 can normally receive an uplink signal sent by the terminal device 6, the terminal device 6 increases power of a transmit signal of the terminal device 6. In this case, the uplink signal sent by the terminal device interferes with an uplink signal sent by another terminal device in the LTE cell 6. In some other embodiments, two cells provided by the access network device 5 may alternatively be both NR cells, and the two NR cells are intra-standard inter-frequency cells. In this case, for a manner of forming near-far interference to the terminal device 6, refer to the foregoing described manner. Details are not described herein again.

Figure 2A:
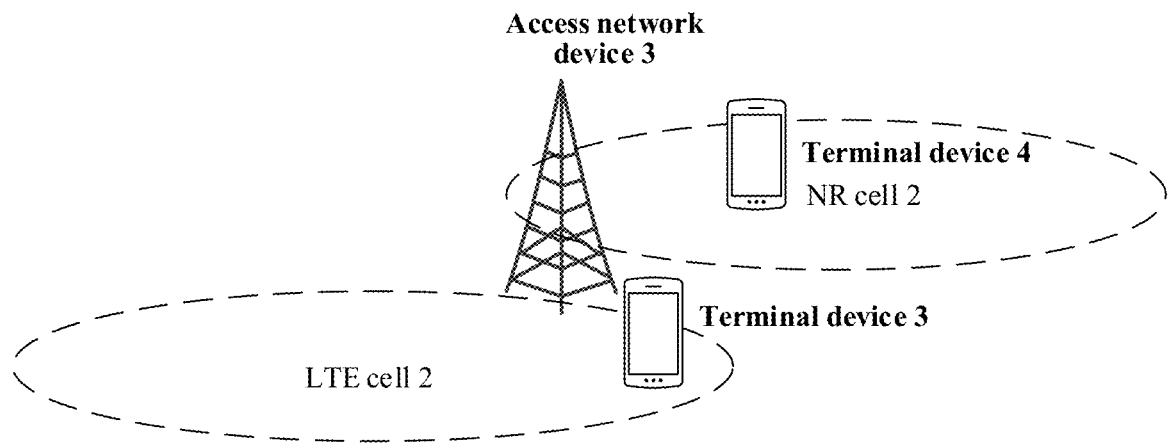
FIG. 2A and FIG. 2B are schematic diagrams of some other network architectures according to embodiments of this application.

FIG. 2A is a schematic diagram of another network architecture according to an embodiment of this application. FIG. 2A includes an access network device 3 and one or more terminal devices (where a terminal device 3 and a terminal device 4 are used as examples in the figure, the terminal device 3 is camped on an LTE cell 2, and the terminal device 4 is camped on an NR cell 2). Specifically, the LTE cell 2 corresponds to the access network device 3. This may be understood as that the access network device 3 provides the LTE cell 2, and provides a communication service for the terminal device 3 through the LTE cell 2. The NR cell 2 corresponds to the access network device 3. This may be understood as that the access network device 3 provides the NR cell 2, and provides a communication service for the terminal device 4 through the NR cell 2.

In a system shown in FIG. 2A, the access network device 3 may send, through the LTE cell 2, a signal to one or more terminal devices (for example, the terminal device 3) camped on the LTE cell 2, and the access network device 3 may send, through the NR cell 2, a signal to one or more terminal devices (for example, the terminal device 4) camped on the NR cell 2. When the access network device 3 sends a signal to the terminal device 4 through the NR cell 2, the terminal device 3 may receive the signal sent by the access network device 3. The signal causes interference to communication between the terminal device 3 and the access network device 3 through the LTE cell 2. Therefore, the signal may be considered as an interference signal. In addition, to ensure that the access network device 3 can normally receive an uplink signal sent by the terminal device 3, the terminal device 3 increases power of a transmit signal of the terminal device 3. In this case, the uplink signal sent by the terminal device interferes with an uplink signal sent by another terminal device in the LTE cell 2.

Figure 2B:
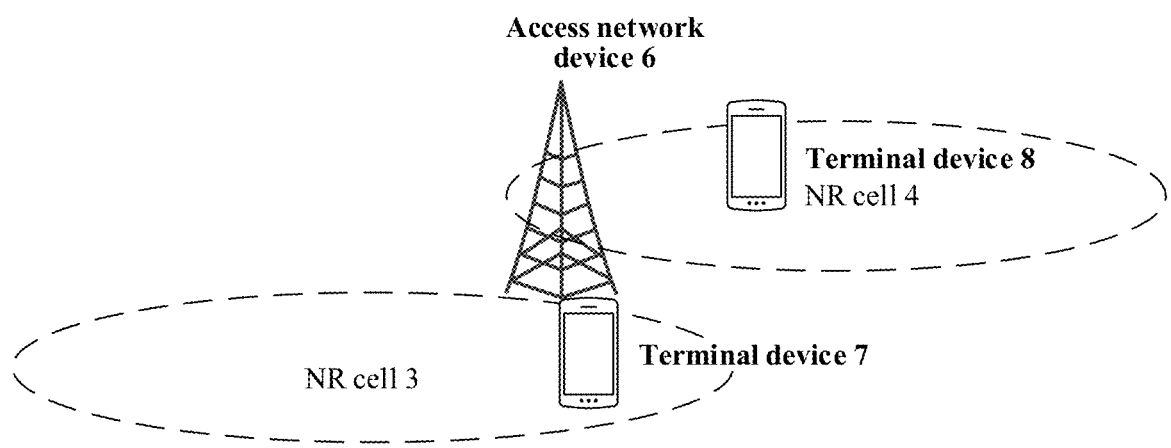

FIG. 2B is a schematic diagram of another network architecture according to an embodiment of this application. FIG. 2B includes an access network device 6 and one or more terminal devices (where a terminal device 7 and a terminal device 8 are used as examples in the figure, the terminal device 7 is camped on an NR cell 3, and the terminal device 8 is camped on an NR cell 4). Specifically, the NR cell 3 corresponds to the access network device 7. This may be understood as that the access network device 6 provides the NR cell 3, and provides a communication service for the terminal device 7 through the NR cell 3. The NR cell 4 corresponds to the access network device 6. This may be understood as that the access network device 6 provides the NR cell 4, and provides a communication service for the terminal device 8 through the NR cell 4. The NR cell 3 and the NR cell 4 are cells of a same standard, but a center frequency of a downlink reference signal of the NR cell 3 is different from a center frequency of a downlink reference signal of the NR cell 4, and a frequency range of the NR cell 3 and a frequency range of the NR cell 4 overlap. The NR cell 3 and the NR cell 4 are intra-standard inter-frequency cells.

In a system shown in FIG. 2B, the access network device 6 may send, through the NR cell 3, a signal to one or more terminal devices (for example, the terminal device 7) camped on the NR cell 3, and the access network device 6 may send, through the NR cell 4, a signal to one or more terminal devices (for example, the terminal device 8) camped on the NR cell 4. When the access network device 6 sends a signal to the terminal device 8 through the NR cell 4, the terminal device 7 may receive the signal sent by the access network device 6. The signal causes interference to communication between the terminal device 7 and the access network device 6 through the NR cell 3. Therefore, the signal may be considered as an interference signal. In addition, to ensure that the access network device 6 can normally receive an uplink signal sent by the terminal device 7, the terminal device 7 increases power of a transmit signal of the terminal device 7. In this case, the uplink signal sent by the terminal device interferes with an uplink signal sent by another terminal device in the NR cell 3.

In some other embodiments, the two cells provided by the access network device 6 may alternatively be both LTE cells, and the two LTE cells are intra-standard inter-frequency cells. In this case, for a manner of forming near-far interference to the terminal device 7, refer to the foregoing described manner. Details are not described herein again.

It should be noted that the wireless communication system in embodiments of this application includes, but is not limited to, a narrowband internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, a 5th generation (5G) mobile communication system, or a future mobile communication system.

The access network device in embodiments of this application may be a base station (BS). The base station may provide a communication service for a plurality of terminal devices, and a plurality of base stations may also provide a communication service for a same terminal device. In embodiments of this application, the base station is an apparatus deployed in a radio access network to provide a wireless communication function for a terminal device. The base station device may be a base station, a relay station, or an access point. The base station may be a base transceiver station (BTS) in a global system for mobile communications (GSM) or code division multiple access (CDMA) network, may be an NB (NodeB) in wideband code division multiple access (WCDMA), or may be an eNB or an eNodeB (Evolutional NodeB) in long term evolution (LTE). The base station device may alternatively be a radio controller in a cloud radio access network (CRAN) scenario. The base station device may alternatively be a base station device in a future 5G network or an access network device in a future evolved PLMN network. The base station device may alternatively be a wearable device, a vehicle-mounted device, or the like. In embodiments of this application, an apparatus configured to implement a function of the access network device may be the access network device, or may be an apparatus that can support the access network device in implementing the function, for example, a chip system. The apparatus may be installed in the access network device.

The terminal device in embodiments of this application may also be referred to as a terminal, and may be a device having a wireless transceiver function. The terminal device in embodiments of this application may include user equipment (UE), an access terminal, a UE unit, a UE station, a mobile station, a remote station, a remote terminal, a mobile device, a UE terminal, a terminal, a wireless communication device, a UE agent, or a UE apparatus that has a wireless communication function. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved PLMN. In embodiments of this application, an apparatus configured to implement a function of the terminal may be a terminal, or may be an apparatus, for example, a chip system, that can support the terminal in implementing the function. The apparatus may be installed in the terminal. In embodiments of this application, the chip system may include a chip, or may include a chip and another discrete component.

The following describes some concepts in embodiments of this application.

A communication standard (or a standard for short) is a network standard used by a mobile terminal to perform data communication. For example, for a 2nd generation mobile communication technology (2G), communication standards include GSM and CDMA. For a 3G 3rd-generation mobile communication technology (3G), communication standards include time division-synchronous code division multiple access (TD-SCDMA), WCDMA and CDMA2000 (Code Division Multiple Access 2000). For a 4th generation mobile communication technology (4G), communication standards include two standards: time division duplex long term evolution (Long Term Evolution Time-Division Duplex, LTE-TDD) and frequency division duplex long term evolution (Long Term Evolution Frequency-division duplex, LTE-FDD), where the LTE-TDD is also referred to as TD-LTE. For a 5th generation mobile communication technology (5G), communication standards include non-standalone (NSA) networking and standalone (SA) networking. In embodiments of this application, in a same frequency band, two neighboring cells may support different communication standards.

In an evolution process of mobile communication, for example, in a process of evolution from 4G to 5G, intra-frequency networking of LTE and NR often occurs in a communication system. The following describes several common network architectures.

Figure 3:
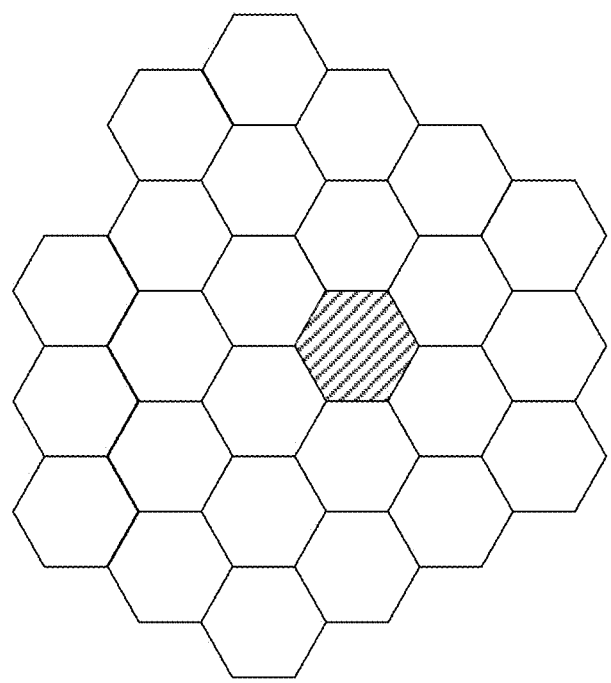
FIG. 3 to FIG. 5 are schematic diagrams of some other network architectures according to embodiments of this application.
Figure 3:
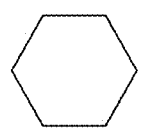
Figure 3:
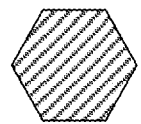
Figure 4:
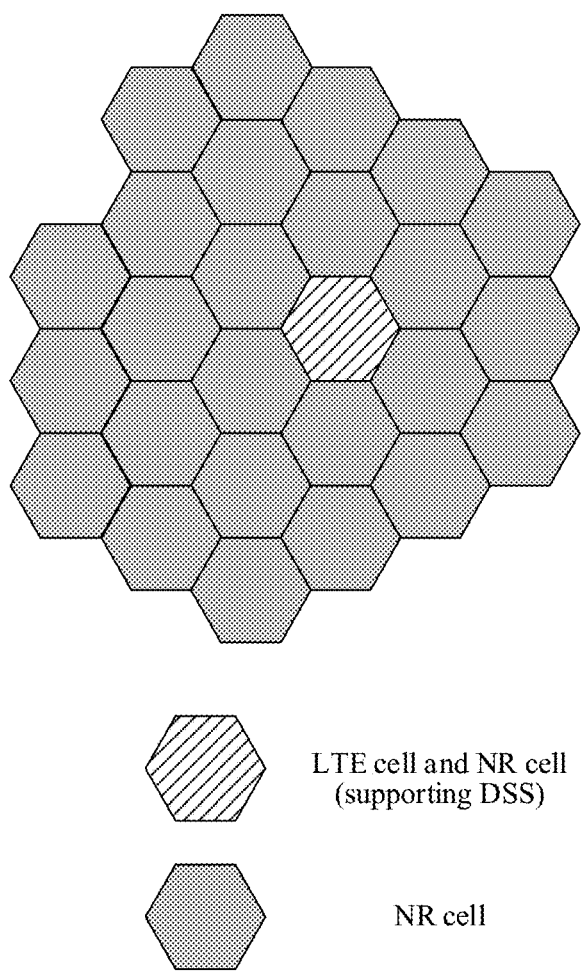

FIG. 3 is a schematic diagram of another network architecture according to an embodiment of this application. Corresponding to FIG. 1A and FIG. 2A, a plurality of communication cells may be included in an area range shown in FIG. 3. These communication cells use an LTE communication standard, and LTE network coverage is complete. In an evolution process, an access network device in which some communication cells are located is selected to create a cell that uses an NR communication standard (an NR cell for short), and the newly created NR cell shares a part of frequency resources with a co-coverage cell that uses the LTE communication standard (an LTE cell for short) by using a dynamic spectrum sharing (DSS) function. In a subsequent evolution process, a cell deployment range of the NR communication standard is gradually expanded. It should be noted that a hexagon area in FIG. 3 represents a coverage area of a cell. For a same mark in the following figures, refer to the description. It should be noted that, for a network architecture formed by a neighboring NR cell supporting the DSS and a neighboring LTE cell not supporting the DSS in FIG. 3, refer to the network architectures shown in FIG. 1A and FIG. 2A. FIG. 4 is a schematic diagram of another network architecture according to an embodiment of this application. An area range shown in FIG. 4 includes a plurality of communication cells, and some communication cells use an LTE communication standard. In an evolution process, an access network device in which some LTE communication standard cells are located is selected to create an NR cell, and the newly created NR cell shares a part of frequency resources with a co-coverage LTE cell by using a DSS function. An access network device in which another communication cell is located directly creates an NR standard cell, so that NR network coverage is complete. In a subsequent evolution process, a cell deployment range of the LTE communication standard is gradually reduced. It should be noted that, for a network architecture formed by a neighboring LTE cell supporting the DSS and a neighboring NR cell not supporting the DSS in FIG. 4, refer to the network architectures shown in FIG. 1A and FIG. 2A.

Figure 5:
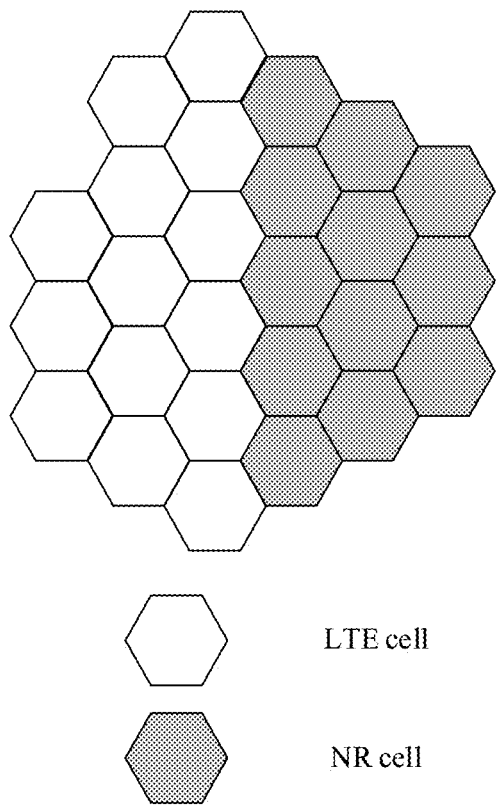

FIG. 5 is a schematic diagram of another network architecture according to an embodiment of this application. An area range shown in FIG. 5 includes a plurality of communication cells. A communication cell in a left area of these communication cells uses an LTE communication standard, and a communication cell in a right area of these communication cells uses an NR communication standard. Evolution to NR in a manner of LTE spectrum concession means that a frequency occupation range of the LTE communication standard is gradually reduced, and a frequency occupation range of the NR communication standard is gradually increased. It should be noted that, for a network architecture formed by a neighboring LTE cell and a neighboring NR cell in FIG. 5, refer to the network architectures shown in FIG. 1A and FIG. 2A.

Figure 6A:
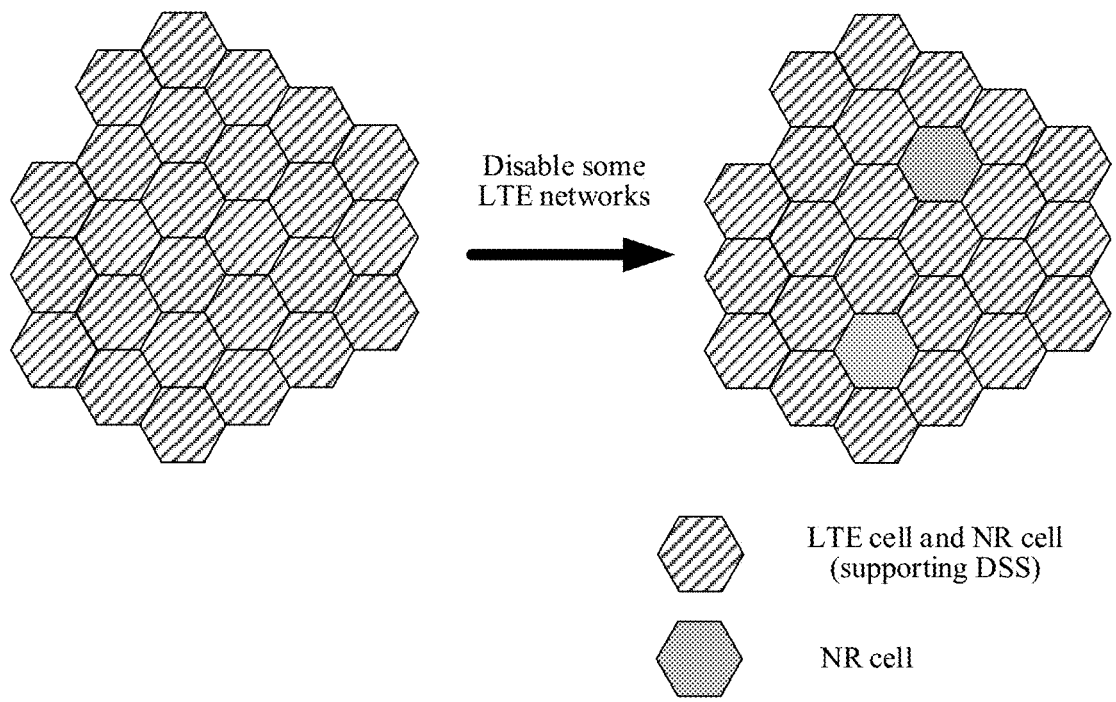
FIG. 6A and FIG. 6B are schematic diagrams of some other network architectures according to embodiments of this application.
Figure 6B:
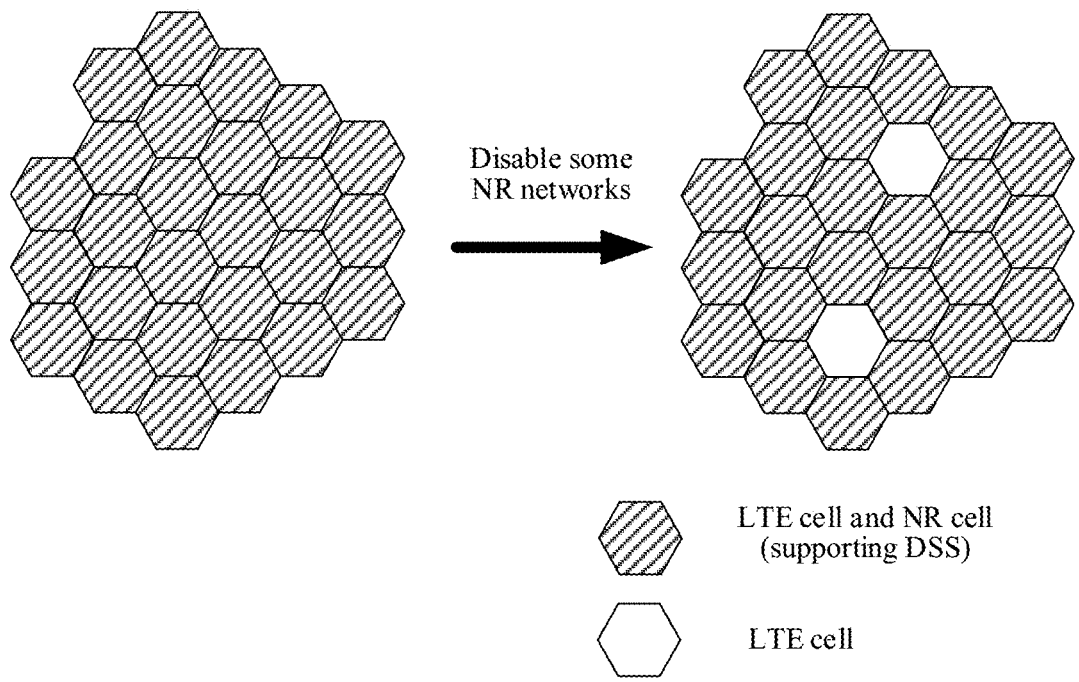

FIG. 6A and FIG. 6B are schematic diagrams of some other network architectures according to embodiments of this application. Area ranges shown in FIG. 6A and FIG. 6B include a plurality of communication cells, and an LTE network and an NR network with full coverage are deployed in these communication cells by using a DSS function. However, in some implementation scenarios, after some functions of an access network device are enabled, the LTE network may be dynamically selected to be disabled based on load (which may be understood as not using an LTE communication standard for communication, and reference may be made to FIG. 6A) or the NR network may be dynamically selected to be disabled based on load (which may be understood as not using an NR communication standard for communication, and reference may be made to FIG. 6B), to form a scenario in which LTE discontinuous mixed deployment or NR discontinuous mixed deployment occurs in some areas, in some access network devices, or at some time. It should be noted that, for a network architecture formed by a neighboring LTE cell supporting the DSS and a neighboring NR cell not supporting the DSS in FIG. 6A, refer to the network architectures shown in FIG. 1A and FIG. 2A. For a network architecture formed by a neighboring NR cell supporting the DSS and a neighboring LTE cell not supporting the DSS in FIG. 6B, refer to the network architectures shown in FIG. 1A and FIG. 2A.

Figure 7:
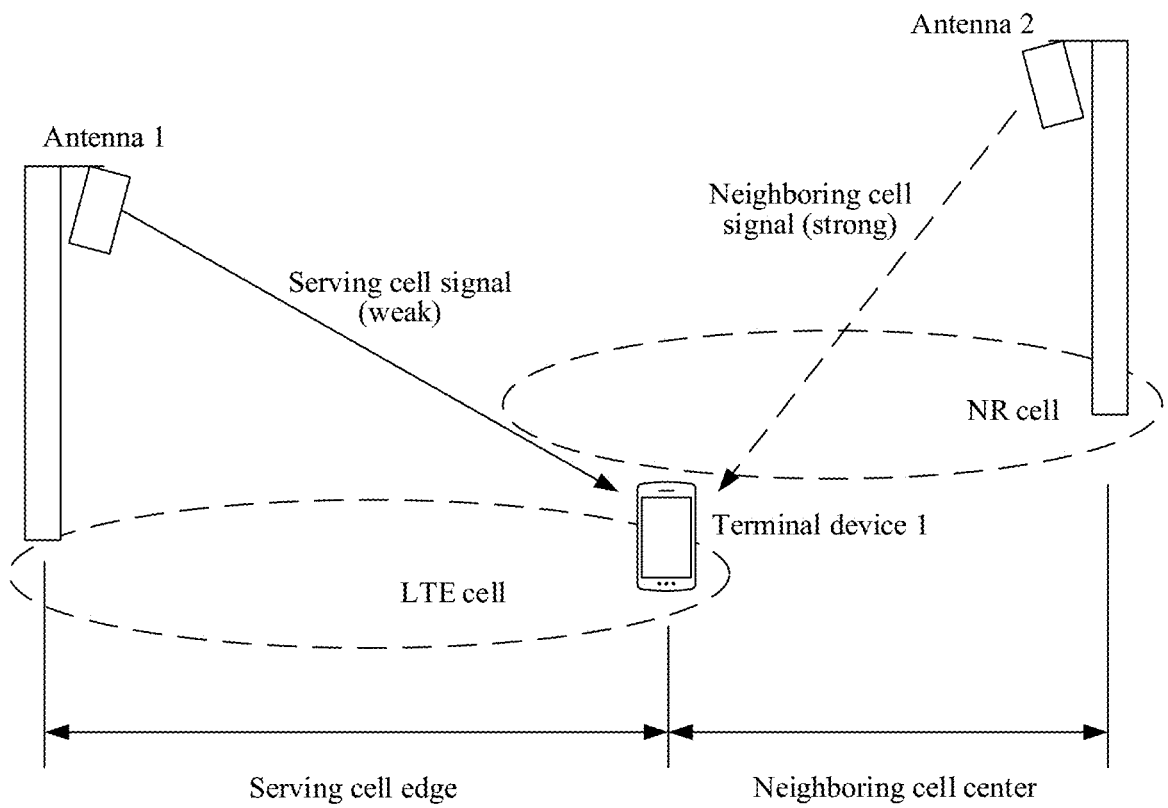
FIG. 7 to FIG. 9 are schematic diagrams of some other network architectures according to embodiments of this application.

In a border area of LTE and NR intra-frequency networking, a terminal device is vulnerable to near-far interference. The following describes causes of the near-far effect. FIG. 7 is a schematic diagram of another network architecture according to an embodiment of this application. For example, the network architecture shown in FIG. 1A may be used as an example of the network architecture shown in FIG. 7. The network architecture shown in FIG. 7 includes an antenna 1 of an access network device (where reference may be made to the access network device 1 in FIG. 1A), an antenna 2 of an access network device (where reference may be made to the access network device 2 in FIG. 1A), and a terminal device 1 (where reference may be made to the terminal device 1 in FIG. 1A). The antenna 1 provides a communication signal for a terminal device accessing an LTE cell, and the antenna 2 provides a communication signal for a terminal device accessing an NR cell. The access network device to which the antenna 1 belongs and the access network device to which the antenna 2 belongs may be a same access network device, or may be different access network devices.

In the network architecture shown in FIG. 7, both the LTE cell and the NR cell are located on a frequency band F1, and the terminal device 1 originally accesses the LTE cell. The antenna 1 sends a signal (namely, a service signal) to the terminal device 1 accessing the LTE cell through the LTE cell, and the antenna 2 may send a signal to one or more terminal devices that access the NR cell through the NR cell. When the antenna 2 sends the signal to the one or more terminal devices through the NR cell, the terminal device 1 may receive the signal sent by the antenna 2. The signal is a neighboring cell signal received by the terminal device 1. The signal causes interference to communication between the terminal device 1 and the antenna 1. Therefore, the signal may be considered as an interference signal. In a process in which the terminal device 1 moves from a coverage area of the LTE cell to a coverage area of the NR cell, the service signal that is sent by the LTE cell and that is received by the terminal device 1 becomes weaker, and a service signal (which may be understood as an interference signal) sent by the NR cell becomes stronger.

Because in both LTE and NR communication systems, intra-frequency measurement and handover in a same communication standard are performed to ensure that a mobile terminal can always be in a cell with a strongest signal in the same communication standard, the terminal device cannot perform inter-standard intra-frequency measurement without additional power consumption. Therefore, the terminal device keeps camping on the LTE cell before a specific condition (for example, signal quality of a serving cell is higher than a preset value) is met. For the terminal device, the LTE cell on which the terminal device is camped is far, and the neighboring NR cell is near, which causes the near-far effect. To be specific, strength of the service signal provided by the LTE cell is weaker than strength of a neighboring cell signal of the NR cell, and the neighboring cell signal of the NR cell causes strong interference to the service signal received by the terminal device. In addition, to ensure that the antenna 1 of the LTE cell can normally receive an uplink signal sent by the terminal device 1, the terminal device 1 increases power of a transmit signal of the terminal device 1. In this case, the uplink signal sent by the terminal device interferes with an uplink signal sent by another terminal device in the LTE cell.

Figure 8:
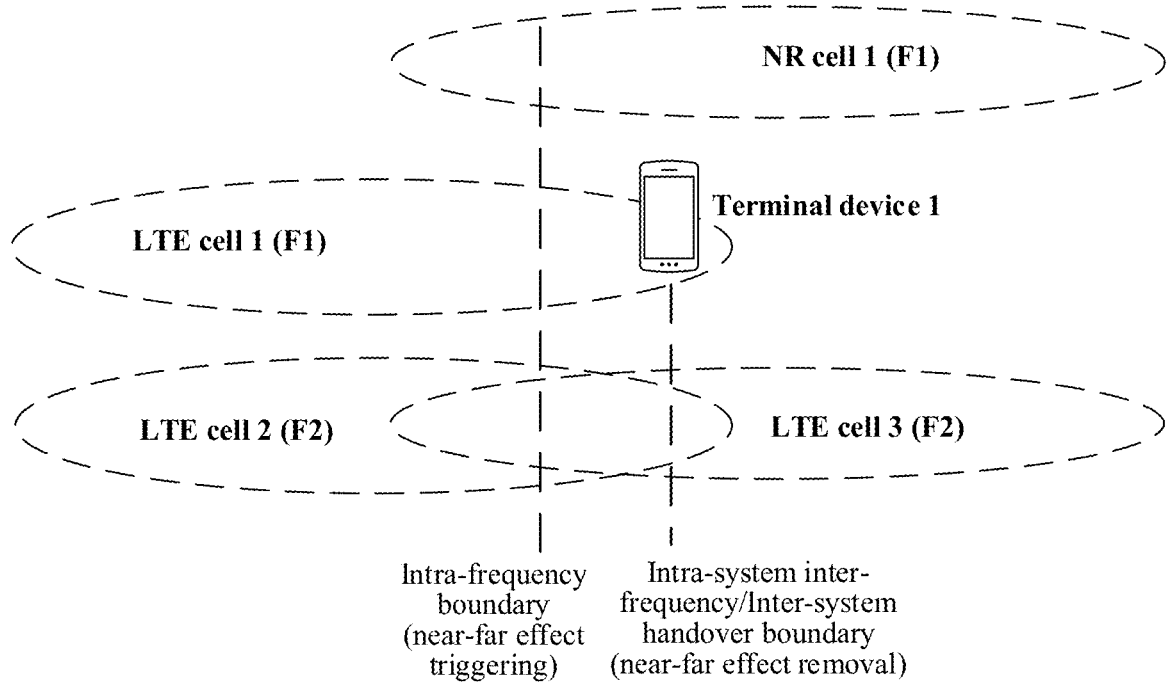

Generally, an operator network that provides communication is of multi-frequency networking. When a terminal device receives a poor intra-frequency signal, inter-frequency/inter-system measurement and handover to another frequency are triggered. Therefore, a near-far effect problem of the terminal is resolved only after the inter-frequency/inter-system measurement and handover are performed. FIG. 8 is a schematic diagram of another network architecture according to an embodiment of this application. The network architecture shown in FIG. 8 includes an LTE cell 1, an LTE cell 2, an LTE cell 3, an NR cell 1, and a terminal device 1. Both the LTE cell 1 and the NR cell 1 are located on a frequency band F1, and both the LTE cell 2 and the LTE cell 3 are located on a frequency band F2. The terminal device accesses the LTE cell 1. Communication signals sent through the LTE cell 2, the LTE cell 3, and the NR cell 1 are all neighboring cell signals for the terminal device 1. However, because the signals sent through the LTE cell 2 and the LTE cell 3 and the signal sent through the LTE cell 1 are not on a same frequency band, the signals sent through the LTE cell 2 and the LTE cell 3 are not interference signals for the terminal device 1. The communication signal sent through the NR cell 1 and the communication signal sent through the LTE cell 1 are on a same frequency band. Therefore, the communication signal sent through the NR cell 1 is an interference signal for the terminal device 1.

In a process in which the terminal device 1 moves from a coverage area of the LTE cell 1 to a coverage area of the NR cell 1, a service signal that is sent by the LTE cell 1 and that is received by the terminal device 1 becomes weaker, and the neighboring cell signal (which may be understood as an interference signal) sent by the NR cell 1 becomes stronger. On an intra-frequency boundary shown in FIG. 8, quality of the signal that is of the NR cell 1 and received by the terminal device 1 is stronger than quality of the signal of the LTE cell 1, and a near-far effect is triggered. In this case, because the quality of the signal of the serving cell (the LTE cell 1) is higher than or equal to a preset value, the terminal device 1 keeps camping on the LTE cell 1. In an area on the right of the intra-frequency boundary and on the left of an intra-system inter-frequency/inter-system handover boundary, the terminal device 1 is continuously affected by the near-far effect. On the intra-system inter-frequency/inter-system handover boundary in FIG. 8, the quality of the signal that is of the LTE cell 1 and received by the terminal device 1 is lower than the preset value, an access network device (an access network device corresponding to the LTE cell 1) triggers the terminal device 1 to perform an intra-system inter-frequency/inter-system handover. For example, the terminal device 1 may be handed over to the LTE cell 3. After the handover, because the LTE cell 3 and the NR cell 1 are located on different frequency bands, the terminal device 1 is no longer affected by the near-far effect.

Similar to LTE and NR intra-frequency networking, when frequency ranges of neighboring intra-standard inter-frequency cells overlap, the terminal device is also vulnerable to the near-far interference. The LTE cell 6 and the LTE cell 7 in FIG. 1B are used as an example. In a process in which the terminal device 6 performs intra-frequency measurement, because a center frequency of a downlink reference signal of the LTE cell 6 and a center frequency of a downlink reference signal of the LTE cell 7 are different, the terminal device 6 cannot detect the downlink reference signal of the LTE cell 7. Therefore, the terminal device 6 keeps camping on the LTE cell 6 before a specific condition (for example, signal quality of the LTE cell 6 is higher than a preset value) is met. For the terminal device 6, the LTE cell 6 on which the terminal device 6 is camped is far, and the neighboring LTE cell 7 is near, which causes the near-far effect. To be specific, strength of a service signal provided by the LTE cell 6 is weaker than strength of a neighboring cell signal of the LTE cell 7, and the neighboring cell signal of the LTE cell 7 causes strong interference to the service signal received by the terminal device 6. In addition, to ensure that the LTE cell 6 can normally receive an uplink signal sent by the terminal device 6, the terminal device 6 increases power of a transmit signal of the terminal device 6. In this case, the uplink signal sent by the terminal device 6 interferes with an uplink signal sent by another terminal device in the LTE cell 6.

Figure 9:
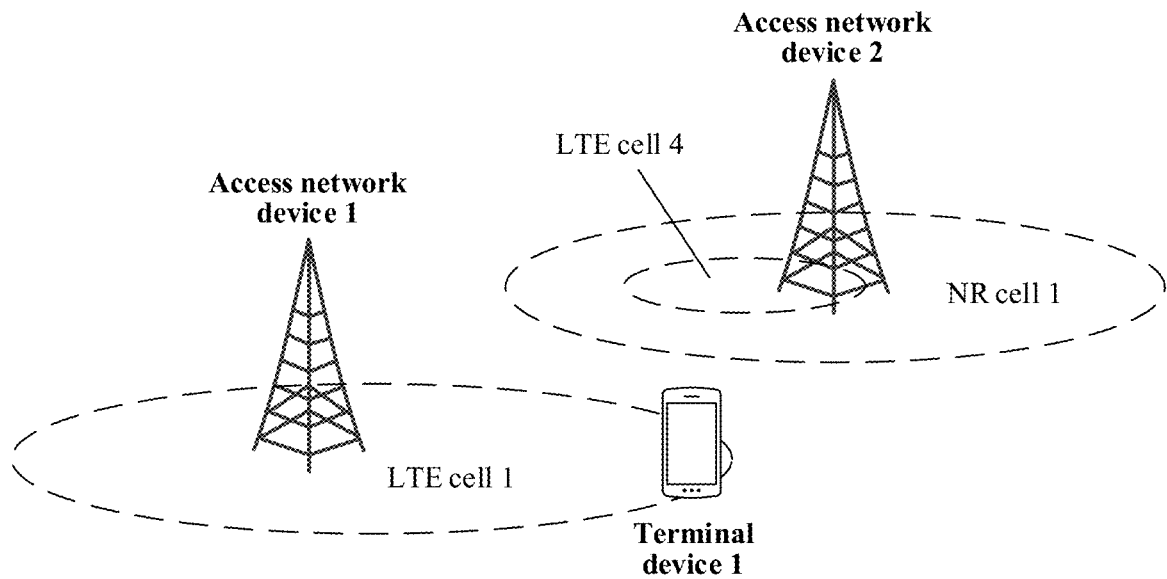

Based on the network architecture, the terminal device, and the access network device described in the foregoing content, the following describes a cell measurement method according to an embodiment of this application. For ease of understanding, the network structure shown in FIG. 1A is used as an example. In this embodiment of this application, an LTE cell 4 is created in the NR cell 1 (where reference may be made to a network architecture shown in FIG. 9). The LTE cell 4 occupies some time-frequency resources originally belonging to the NR cell 1, and sends a downlink reference signal to a terminal device. In a process in which the terminal device 1 performs intra-frequency measurement in a same communication standard, the terminal device may detect existence of the LTE cell 4 and signal quality of the LTE cell 4 based on the downlink reference signal sent by the LTE cell 4. Because the LTE cell 4 occupies some time-frequency resources originally belonging to the NR cell 1 to send the downlink reference signal, the signal quality of the LTE cell 4 may be considered as signal quality of the NR cell 1.

When the signal quality of the LTE cell 4 is higher than signal quality of the LTE cell 1, an intra-frequency measurement report fed back by the terminal device to a first access network device includes information about the LTE cell 4. The signal quality of the LTE cell 4 is higher than the signal quality of the LTE cell 1, and this indicates that a neighboring cell signal of the NR cell 1 that is an intra-frequency inter-standard cell of the LTE cell 1 is stronger than a serving signal of the LTE cell 1. In this case, near-far interference is caused.

Then, the access network device 1 may determine, based on the information about the LTE cell 4 in the intra-frequency measurement report, that the intra-frequency inter-standard neighboring cell signal is stronger than the serving signal in an environment in which the mobile terminal is currently located. Then, the access network device 1 migrates the terminal device 1 to an intra-standard inter-frequency cell or an inter-standard cell, to avoid the near-far interference.

Figure 10:
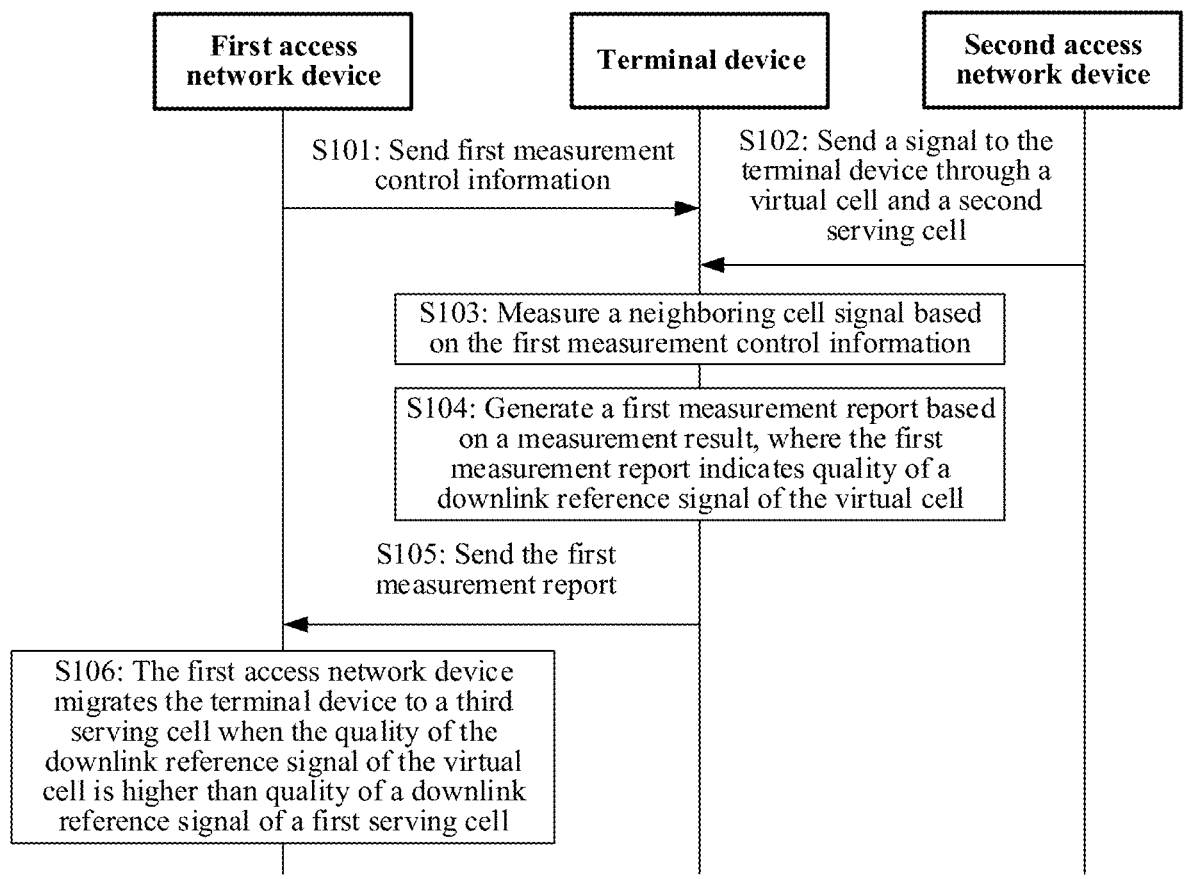
FIG. 10 is a flowchart of a cell measurement method according to an embodiment of this application.

FIG. 10 is a flowchart of a cell measurement method according to an embodiment of this application. The method includes the following steps. It should be noted that in the following content, a first access network device may be the access network device 1 in FIG. 9, a first serving cell may be the LTE cell 1 in FIG. 9, a virtual cell may be the LTE cell 4 in FIG. 9, a second serving cell may be the NR cell 1 in FIG. 9, and a terminal device may be the terminal device 1 in FIG. 9. The serving cell is a cell that can provide services such as access and uplink/downlink data transmission for the terminal device, and may also be referred to as a normal cell or a cell. The virtual cell is a cell that only sends a downlink signal to the terminal device, so that the terminal device performs cell measurement. The virtual cell does not provide the access service or the uplink/downlink data transmission service for the terminal device. The virtual cell may also be referred to as an unreal cell, a simulated cell, or the like. The foregoing names are merely used to distinguish between the two types of cells. In an actual application process, there may be other names. This is not limited in this embodiment.

S101: The first access network device sends first measurement control information to the terminal device through the first serving cell.

The first serving cell is a communication cell currently accessed (or referred to as camped on) by the terminal device. In some embodiments, after the terminal device successfully accesses the first serving cell, the first access network device sends the first measurement control information to the terminal device through the first serving cell. It should be noted that, in a process in which the terminal device camps on the first serving cell, the terminal device continuously performs intra-frequency measurement based on the first measurement control information. The intra-frequency measurement does not cause extra function consumption of the terminal device.

In some implementations, the first measurement control information includes indication information, and the indication information indicates a type of a measurement event. For example, the type of the measurement event may include an A1 event (indicating that signal quality of a serving cell is higher than a specific threshold), an A2 event (indicating that the signal quality of the serving cell is lower than a specific threshold), an A3 event (indicating that signal quality of an intra-frequency neighboring cell is higher than the signal quality of the serving cell), and the like. In this embodiment of this application, the first measurement control information includes indication information indicating the A3 event. In other words, in this embodiment of this application, the first measurement control information indicates the terminal device to feed back a first measurement report to the first access network device when the signal quality of the intra-frequency neighboring cell is higher than the signal quality of the serving cell. The signal quality may also be understood as signal strength. Reference signal received power (RSRP) of a cell may be a reference indicator of the signal quality. The signal quality may also have another reference indicator. This is not limited in this application.

In some implementations, the first measurement control information indicates the terminal device to measure quality of a downlink reference signal of the virtual cell. A center frequency of a downlink reference signal of the first serving cell is the same as a center frequency of the downlink reference signal of the virtual cell. In this manner, the terminal device may be indicated to perform intra-frequency detection based on the center frequency of the downlink reference signal of the virtual cell, so that the terminal device can detect the virtual cell.

A frequency range of the virtual cell is included in a frequency range of the second serving cell, and the frequency range of the second serving cell overlaps with a frequency range of the first serving cell. A standard of the second serving cell is different from a standard of the first serving cell (for example, in correspondence to a case shown in FIG. 9). Alternatively, a standard of the second serving cell is the same as a standard of the first serving cell and a center frequency of a downlink reference signal of the second serving cell is different from the center frequency of the downlink reference signal of the first serving cell (for example, in correspondence to a case shown in FIG. 1B).

When the first serving cell supports a different communication standard, content included in the first measurement control information is different. The following separately describes the two possible cases.

In a possible case, the communication standard supported by the first serving cell (or the virtual cell) is an LTE communication standard, and the communication standard supported by the second serving cell is an NR communication standard. The first measurement control information may include a center frequency of a downlink reference signal of a cell and measurement bandwidth. The center frequency of the downlink reference signal of the cell is the same as the center frequency of the downlink reference signal of the first serving cell and the center frequency of the downlink reference signal of the virtual cell, and the measurement bandwidth is bandwidth of the virtual cell. Optionally, the bandwidth of the virtual cell is one of 1.4 MHz, 3 MHz, 5 MHz, 10 MHz, 15 MHz and 20 MHz.

Figure 11:
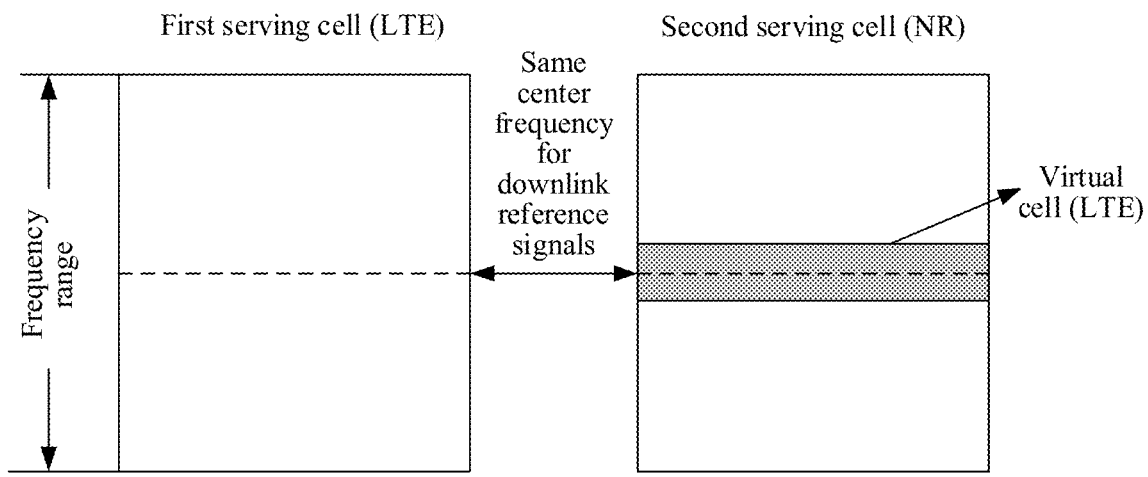
FIG. 11 is a schematic diagram of frequency ranges of a first serving cell, a virtual cell, and a second serving cell according to an embodiment of this application.

A first frequency range may be determined based on the center frequency of the downlink reference signal of the cell and the measurement bandwidth. The first frequency range is the same as the frequency range of the virtual cell. FIG. 11 is a schematic diagram of frequency ranges of a first serving cell, a virtual cell, and a second serving cell according to an embodiment of this application. A center frequency of a downlink reference signal of the first serving cell is the same as a center frequency of a downlink reference signal of the virtual cell. A frequency range of the second serving cell overlaps with a frequency range of the first serving cell. Optionally, the frequency range of the first serving cell and the frequency range of the second serving cell may be the same, for example, both may be 2600 MHz to 2620 MHz. The frequency range of the first serving cell may alternatively be different from the frequency range of the second serving cell. For example, the frequency range of the first serving cell is 2600 MHz to 2620 MHz, and the frequency range of the second serving cell is 2600 MHz to 2640 MHz.

In another possible case, the communication standard supported by the first serving cell (or the virtual cell) is an NR communication standard, and the communication standard supported by the second serving cell is an LTE communication standard. The first measurement control information may include a center frequency of a downlink reference signal (which may be specifically a demodulation reference signal (DMRS)) in a synchronization signal and physical broadcast channel block (SSB). The included center frequency of the downlink reference signal in the SSB is the same as a center frequency of a downlink reference signal in an SSB of the first serving cell and a center frequency of a downlink reference signal in an SSB of the virtual cell. Because in NR, measurement bandwidth of the intra-frequency measurement is 20 resource blocks (RBs), the first measurement control information may not need to include measurement bandwidth information. Optionally, the SSB of the virtual cell is 20 RBs, and bandwidth of the virtual cell may have a plurality of values. This is not limited in this embodiment of this application.

Figure 12:
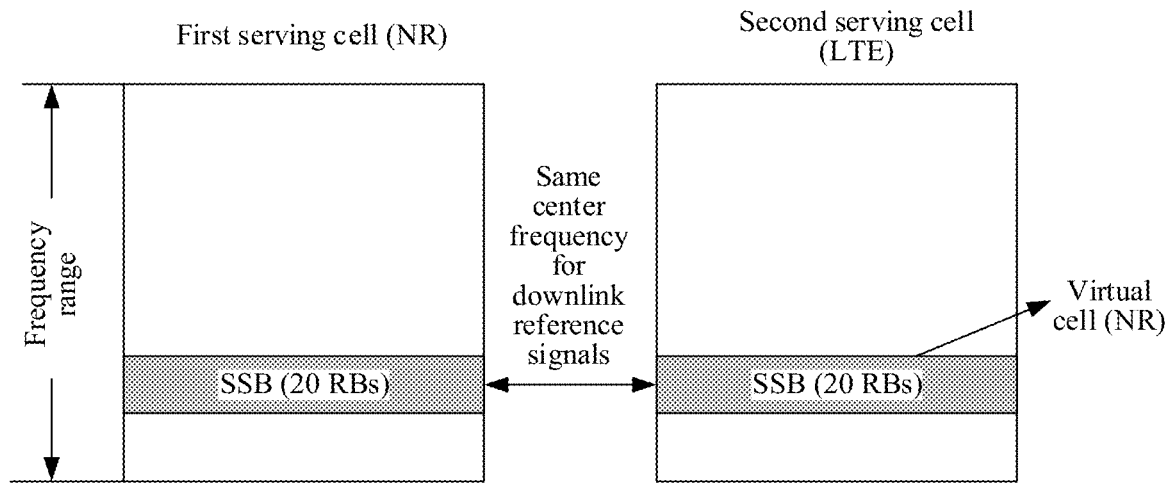
FIG. 12 is another schematic diagram of frequency ranges of a first serving cell, a virtual cell, and a second serving cell according to an embodiment of this application.

A first frequency range may be determined based on the center frequency of the downlink reference signal in the SSB. The first frequency range is the same as the frequency range of the virtual cell. FIG. 12 is another schematic diagram of frequency ranges of a first serving cell, a virtual cell, and a second serving cell according to an embodiment of this application. A center frequency of a downlink reference signal in an SSB of the first serving cell is the same as a center frequency of a downlink reference signal in an SSB of the virtual cell. A frequency range of the second serving cell overlaps with a frequency range of the first serving cell. Optionally, the frequency range of the first serving cell and the frequency range of the second serving cell may be the same, for example, both may be 2600 MHz to 2620 MHz. The frequency range of the first serving cell may alternatively be different from the frequency range of the second serving cell. For example, the frequency range of the second serving cell is 2600 MHz to 2620 MHz, and the frequency range of the first serving cell is 2600 MHz to 2640 MHz.

In some embodiments, the first access network device may generate the first measurement control information based on a center frequency (which may further include measurement bandwidth) that is of a downlink reference signal of the virtual cell and that is sent by a second access network device.

In some embodiments, when constructing a virtual cell, a second access network device may construct the virtual cell based on the center frequency of the downlink reference signal of the first serving cell and the measurement bandwidth, or may construct the virtual cell based on the center frequency of the downlink reference signal in the SSB of the first serving cell.

S102: The second access network device sends a signal to the terminal device through the virtual cell and the second serving cell.

It should be noted that, the virtual cell may be understood as an unreal cell or a simulated cell constructed by the second access network device. A purpose of constructing the virtual cell is mainly to enable the terminal device to discover the virtual cell and measure signal quality of the virtual cell in a process of performing the intra-frequency measurement. For the terminal device, existence of the virtual cell may approximately represent existence of the intra-frequency inter-standard second serving cell. The signal quality of the virtual cell may approximately represent signal quality of the intra-frequency inter-standard second serving cell. The purpose of constructing the virtual cell is not to provide an access service (or referred to as a communication service) for the terminal device.

Specifically, the second access network device sends a downlink signal through the virtual cell, where the downlink signal includes the downlink reference signal of the virtual cell. The downlink signal is used to enable the terminal device to discover the virtual cell and detect the signal quality of the virtual cell. In addition, the second access network device sends a communication signal through the second serving cell, and the communication signal is used to provide a communication service for another terminal device accessing the second serving cell.

For the terminal device accessing the first serving cell, signals sent by the second access network device through the virtual cell and the second serving cell are neighboring cell signals. However, because the second serving cell is an inter-standard communication cell (or an intra-standard inter-frequency cell), in the intra-frequency measurement process, the terminal device cannot detect the signal sent by the second access network device through the second serving cell.

In some embodiments, a time-frequency resource occupied by the signal (for example, the downlink reference signal) sent by the second access network device through the virtual cell is different from a time-frequency resource occupied by the signal sent through the second serving cell. In this manner, interference caused by the communication signal sent through the second serving cell to the downlink reference signal sent through the virtual cell can be avoided, and a measurement result of the intra-frequency measurement is not affected.

Optionally, the second access network device sends, through the second serving cell, indication information to the terminal device accessing the second serving cell. The indication information indicates an available time-frequency resource of the terminal device accessing the second serving cell, and the available time-frequency resource is different from a time-frequency resource occupied by the downlink signal of the virtual cell or indicates that the terminal device accessing the second serving cell does not use a time-frequency resource occupied by the downlink signal sent by the virtual cell.

An indication manner of the indication information may include a dynamic scheduling indication and a semi-persistent resource indication. The dynamic scheduling indication means that the second access network device sends, in the second serving cell, DCI (Downlink Control Information) information (which is understood as the indication information) through a physical downlink control channel (PDCCH). The DCI information indicates the available time-frequency resource of the terminal device accessing the second serving cell, and the available time-frequency resource is different from the time-frequency resource occupied by the downlink signal sent by the virtual cell. The semi-persistent resource indication means that the second access network device sends an RRC reconfiguration message (which is understood as the indication information) in the second serving cell. The RRC reconfiguration message indicates the terminal device accessing the second serving cell not to use the time-frequency resource occupied by the downlink signal sent by the virtual cell. It should be noted that, the second access network device may use any indication manner, or may use different indication manners for different channels of the virtual cell.

In some embodiments, the virtual cell does not provide an access service for the terminal device. In this manner, the second access network device does not need to divide a large quantity of time-frequency resources for the virtual cell to support the communication service for the terminal device, and can reserve as many time-frequency resources as possible for the second serving cell to support the communication service for the terminal device accessing the second serving cell.

The following further describes the downlink signal sent through the virtual cell.

In a possible implementation, the communication standard supported by the virtual cell is the LTE communication standard. The downlink signal includes the downlink reference signal of the virtual cell. The downlink reference signal includes a cell-specific reference signal (CRS). The CRS is used by the terminal device to detect the signal quality of the virtual cell.

Optionally, the downlink signal further includes one or more of a primary synchronization signal (PSS), a secondary synchronization signal (SSS), a physical broadcast channel (PBCH), and system information block (SIB) 1 information. The PSS and the SSS are used by the terminal device to discover (or detect) the virtual cell. The physical broadcast channel is used by the terminal device to detect a system information block. Optionally, the system information block carries indication information (for example, a "barred" identifier), and the indication information indicates that the virtual cell does not provide an access service for the terminal device.

The system information block includes system information. A cell may have a plurality of system information blocks, and these system information blocks carry different information, for example, the SIB 1. The SIB 1 mainly carries configuration information of some cells, for example, information related to random access, information related to a PDCCH, information related to other information blocks, information about a cell accessed by the UE, and identification information of the cell.

Optionally, the second access network device sends only the PSS, the SSS, and the CRS through the virtual cell, so that the virtual cell does not provide the access service for the terminal.

In a possible implementation, the communication standard supported by the virtual cell is the NR communication standard. The downlink reference signal in the downlink signal is a demodulation reference signal (DMRS), the downlink signal is a synchronization signal and physical broadcast channel block (SSB), and the SSB includes the DMRS. The SSB is used by the terminal device to discover (or detect) the virtual cell and detect the signal quality of the virtual cell. Specifically, a radio frequency of the terminal device retrieves, at a center frequency location of the SSB, a PSS and an SSS in the SSB to discover the cell, and detects the signal quality of the virtual cell by using the demodulation reference signal in the SSB.

It should be noted that there is no limitation on a sequence of performing step S101 and step S102.

S103: The terminal device measures the neighboring cell signal based on the first measurement control information.

In some embodiments, the terminal device may determine, based on the first measurement control information, the measurement event and the first frequency range in which the neighboring cell signal that needs to be measured is located. Optionally, the terminal device measures the neighboring cell signal in the first frequency range, and determines a cell identifier and signal quality of the measured neighboring cell, to obtain one or more measurement results.

S104: The terminal device generates the first measurement report based on the measurement result.

The first measurement report includes information about one or more cells detected by the terminal device, and quality of a downlink reference signal of the one or more cells is higher than quality of the downlink reference signal of the first serving cell. In some embodiments, the first measurement report includes information about all cells whose downlink reference signal quality is higher than the quality of the downlink reference signal of the first serving cell.

In some embodiments, the first measurement control information includes indication information indicating a maximum value (for example, N) of a quantity of neighboring cells in the first measurement report. In this case, the first measurement report includes information about a maximum of N cells. Signal quality of the included N cells is stronger than signal quality of a remaining measured neighboring cell.

In this embodiment of this application, the first measurement report indicates the quality of the downlink reference signal of the virtual cell. The first measurement report includes a measurement result of the virtual cell, indicating that quality of the downlink reference signal of the virtual cell is higher than the quality of the downlink reference signal of the first serving cell. It should be noted that, because the virtual cell sends the downlink signal by occupying some time-frequency resources that originally belong to the second serving cell, the signal quality of the virtual cell may be considered as the signal quality of the second serving cell. In this case, the signal sent through the second serving cell affects communication between the terminal device and the first network device, and may easily cause near-far interference.

S105: The terminal device sends the first measurement report to the first access network device.

S106: After the first access network device receives the first measurement report from the terminal device, the first access network device migrates the terminal device to a third serving cell when the quality of the downlink reference signal of the virtual cell is higher than the quality of the downlink reference signal of the first serving cell.

A standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell. In other words, the third serving cell and the first serving cell are intra-standard inter-frequency cells or inter-standard cells. It should be noted that the third serving cell may be the second serving cell, or may be another serving cell.

Optionally, that the quality of the downlink reference signal of the virtual cell is higher than the quality of the downlink reference signal of the first serving cell may be understood as that the first measurement report includes information about the virtual cell. In other words, the terminal device reports the information about the virtual cell only when the quality of the downlink reference signal of the virtual cell is higher than the quality of the downlink reference signal of the first serving cell. The first measurement report may implicitly indicate that the quality of the downlink reference signal of the virtual cell is higher than the quality of the downlink reference signal of the first serving cell.

In some embodiments, there may be another prerequisite for the first access network device to migrate the terminal device to the third serving cell. The following describes some possible prerequisites.

Optionally, the first access network device migrates the terminal device to the third serving cell when the quality of the downlink reference signal of the virtual cell is higher than the quality of the downlink reference signal of the first serving cell, and the quality of the downlink reference signal of the virtual cell is higher than quality of a downlink reference signal of another cell included in the first measurement report. The foregoing case indicates that a neighboring cell signal of the second serving cell that has a same frequency and different standards with the first serving cell is the strongest in detected neighboring cell signals, and the neighboring cell signal of the second serving cell causes strong interference to a serving signal of the first serving cell. In this case, the near-far interference problem is easily caused.

Optionally, the first access network device migrates the terminal device to the third serving cell when the quality of the downlink reference signal of the virtual cell is higher than the quality of the downlink reference signal of the first serving cell and the quality of the downlink reference signal of the virtual cell is higher than a preset value. Optionally, the preset value may be a preset threshold relative to signal quality of the camped cell, or may be a preset absolute threshold. The foregoing case indicates that the signal quality of the virtual cell is strong, and interference to a serving signal of the first serving cell is strong. In this case, the near-far interference problem is easily caused.

Optionally, that the first access network device migrates the terminal device to the third serving cell may be: The first access network device hands over the terminal device to the third serving cell. Alternatively, the manner may be that the first access network device redirects the terminal device to the third serving cell.

The following describes some possible implementations in which the first access network device migrates the terminal device to the third serving cell.

In some implementations, the first access network device sends second measurement control information to the terminal device, where the second measurement control information indicates the terminal device to measure quality of the downlink reference signal of the third serving cell. The first access network device receives a second measurement report from the terminal device, where the second measurement report indicates the quality of the downlink reference signal of the third serving cell. The first access network device migrates the terminal device to the third serving cell based on the second measurement report. It should be noted that the second measurement report includes information about one or more intra-standard inter-frequency cells or inter-standard cells that meet a measurement condition. The first access network device selects the third serving cell from the one or more intra-standard inter-frequency cells or inter-standard cells.

In some implementations, the first access network device stores one or more cell identifiers of one or more serving cells neighboring to the first serving cell. The cell identifiers of the one or more serving cells include a cell identifier of the third serving cell. That the first access network device migrates the terminal device to the third serving cell includes: The first access network device selects the third serving cell from the one or more stored serving cells neighboring to the first serving cell; and the first access network device migrates the terminal device to the third serving cell. Optionally, the cell identifiers of the one or more serving cells neighboring to the first serving cell may be stored in a neighboring cell list. The cell identifier may be a physical cell identifier (PCI).

The following describes some possible implementations in which the first access network device determines that the first measurement report includes the information about the virtual cell.

In some implementations, the first access network device stores a cell identifier of the virtual cell, and a first measurement result includes the cell identifier of the virtual cell. Optionally, the first access network device may store a virtual cell list, and the virtual cell list includes preset cell identifiers of multiple virtual cells.

In some implementations, the first access network device stores the cell identifiers of the one or more serving cells neighboring to the first serving cell, a first measurement result includes a cell identifier of the virtual cell, and the cell identifier of the virtual cell is different from the cell identifiers of the one or more serving cells. Optionally, the cell identifiers of the one or more serving cells neighboring to the first serving cell may be stored in a neighboring cell list. In other words, the neighboring cell list stores the preset cell identifiers of the one or more cells that are neighboring to the first serving cell and that can support the communication service of the terminal device. That the cell identifier is different from the cell identifiers of the one or more serving cells indicates that the virtual cell is not a serving cell.

It should be noted that, in the foregoing embodiment, the network architecture corresponding to FIG. 1A is used as an example to describe implementation steps of the cell measurement method provided in embodiments of this application.

Figure 13:
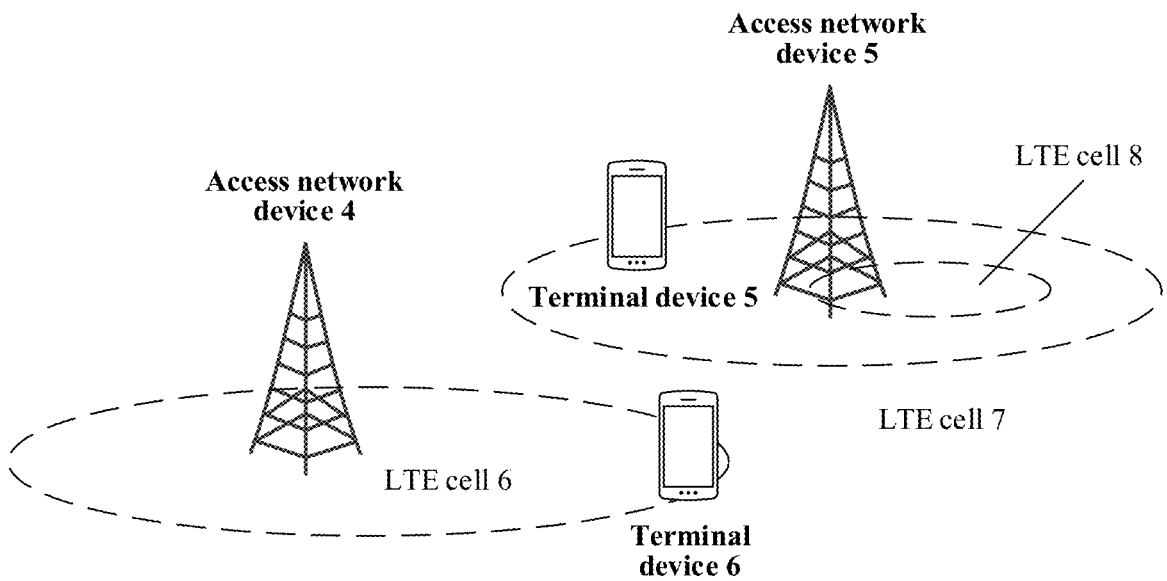
FIG. 13 to FIG. 20 are schematic diagrams of some other network architectures according to embodiments of this application.

In some other embodiments, the method may be further applied to the network architecture corresponding to FIG. 1B. In the network architecture shown in FIG. 1B, an LTE cell 8 is created in the LTE cell 7 (where reference may be made to a network architecture shown in FIG. 13). The LTE cell 8 may be considered as the virtual cell described in the foregoing content, the LTE cell 6 may be considered as the first serving cell described in the foregoing content, the LTE cell 7 may be considered as the second serving cell described in the foregoing content, and the terminal device 6 may be considered as the terminal device described in the foregoing content. The LTE cell 6 corresponds to the access network device 4, and both the LTE cell 7 and the LTE cell 7 correspond to the access network device 5.

Figure 14:
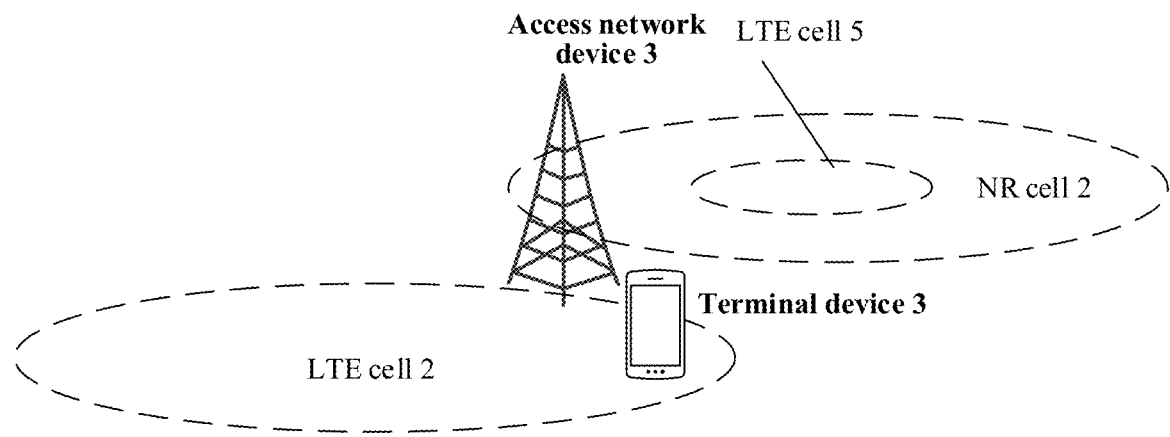

In some other embodiments, the method may be further applied to the network architecture corresponding to FIG. 2A. In the network architecture shown in FIG. 2A, an LTE cell 5 is created in the NR cell 2 (where reference may be made to a network architecture shown in FIG. 14). The LTE cell 5 may be considered as the virtual cell described in the foregoing content, the LTE cell 2 may be considered as the first serving cell described in the foregoing content, the NR cell 2 may be considered as the second serving cell described in the foregoing content, and the terminal device 3 may be considered as the terminal device described in the foregoing content. The LTE cell 5, the LTE cell 2, and the NR cell 2 are all corresponding to the access network device 3. The foregoing described operations performed by the first access network device (namely, the access network device 1) and the second access network device (namely, the access network device 2) are performed by the access network device 3.

In other words, in some embodiments, the access network device 3 further sends a downlink signal through the virtual cell. The access network device 3 further sends a communication signal through the second serving cell.

In some embodiments, the access network device 3 sends, further through the second serving cell, indication information to a terminal device accessing the second serving cell. The indication information indicates an available time-frequency resource of the terminal device accessing the second serving cell, and the available time-frequency resource is different from a time-frequency resource occupied by the downlink signal sent by the virtual cell or indicates that the terminal device accessing the second serving cell does not use a time-frequency resource occupied by the downlink signal sent by the virtual cell.

Figure 15:
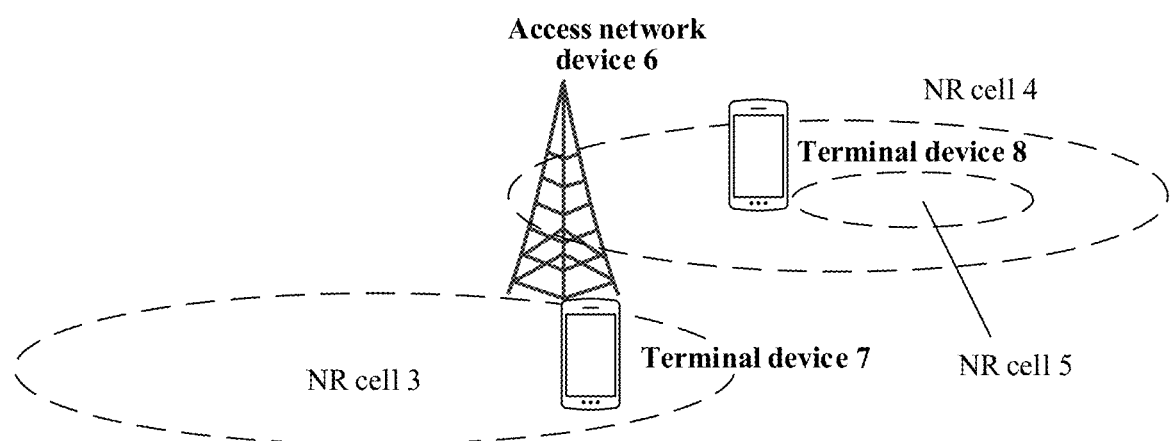

In some other embodiments, the method may be further applied to the network architecture corresponding to FIG. 2B. In the network architecture shown in FIG. 2B, an NR cell 5 is created in the NR cell 4 (where reference may be made to a network architecture shown in FIG. 15). The NR cell 5 may be considered as the virtual cell described in the foregoing content, the NR cell 3 may be considered as the first serving cell described in the foregoing content, the NR cell 4 may be considered as the second serving cell described in the foregoing content, and the terminal device 7 may be considered as the terminal device described in the foregoing content. The NR cell 4, the NR cell 3, and the NR cell 5 all correspond to the access network device 6. In this case, the access network device 6 not only needs to perform the foregoing described operations performed by the first access network device (namely, the access network device 1), but also needs to perform the foregoing described operations performed by the second access network device (namely, the access network device 2).

For specific implementation of these implementations, refer to the descriptions in the foregoing content. Details are not described herein again.

The foregoing describes the cell measurement method provided in embodiments of this application. The following describes an application scenario of embodiments of this application for several cases of LTE and NR intra-frequency networking listed in the foregoing content.

Figure 16:
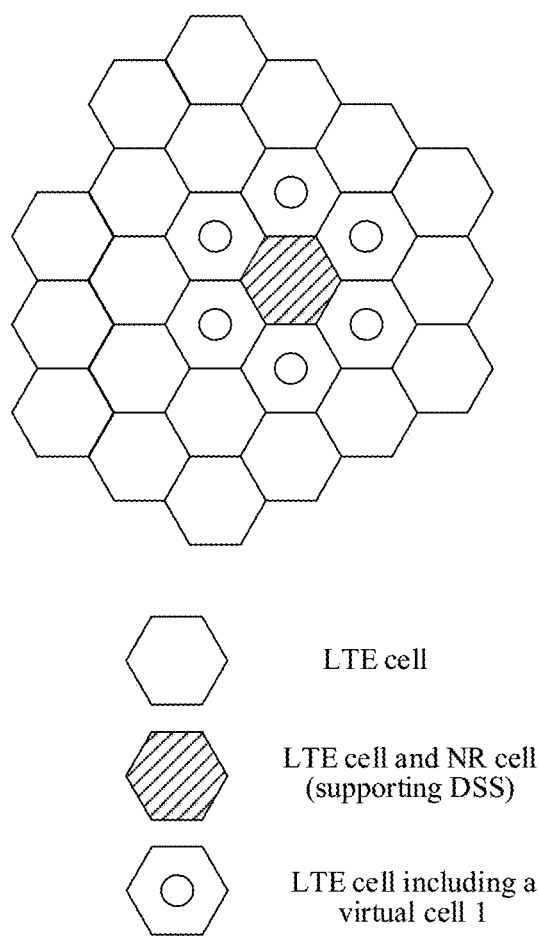

For the network architecture shown in FIG. 3, near-far interference is easily generated between an NR cell that supports DSS and a neighboring LTE cell. Therefore, a virtual cell 1 (where reference may be made to a network architecture shown in FIG. 16) may be deployed in the LTE cell neighboring to the NR cell that supports the DSS, and a communication standard of the virtual cell 1 is an NR communication standard. In other words, the LTE cell neighboring to the NR cell that supports the DSS may be considered as the second serving cell described in the foregoing content, and the NR cell that supports the DSS and that is neighboring to the LTE cell may be considered as the first serving cell described in the foregoing content.

Figure 17:
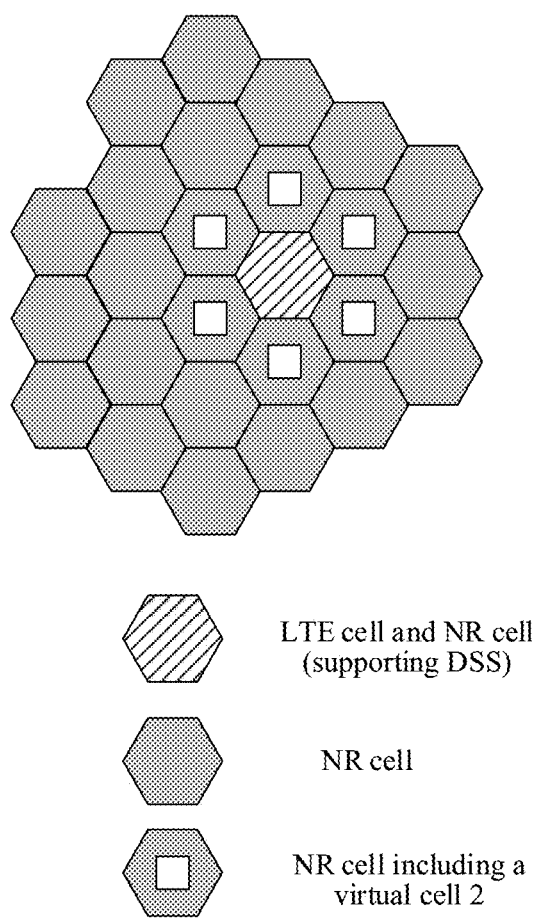

For the network architecture shown in FIG. 4, near-far interference is easily generated between an LTE cell that supports DSS and a neighboring NR cell. Therefore, a virtual cell 2 (where reference may be made to a network architecture shown in FIG. 17) may be deployed in the NR cell neighboring to the LTE cell that supports the DSS, and a communication standard of the virtual cell 2 is an LTE communication standard. In other words, the LTE cell that supports the DSS and that is neighboring to the NR cell may be considered as the first serving cell described in the foregoing content, and the NR cell neighboring to the LTE cell that supports the DSS may be considered as the second serving cell described in the foregoing content.

Figure 18:
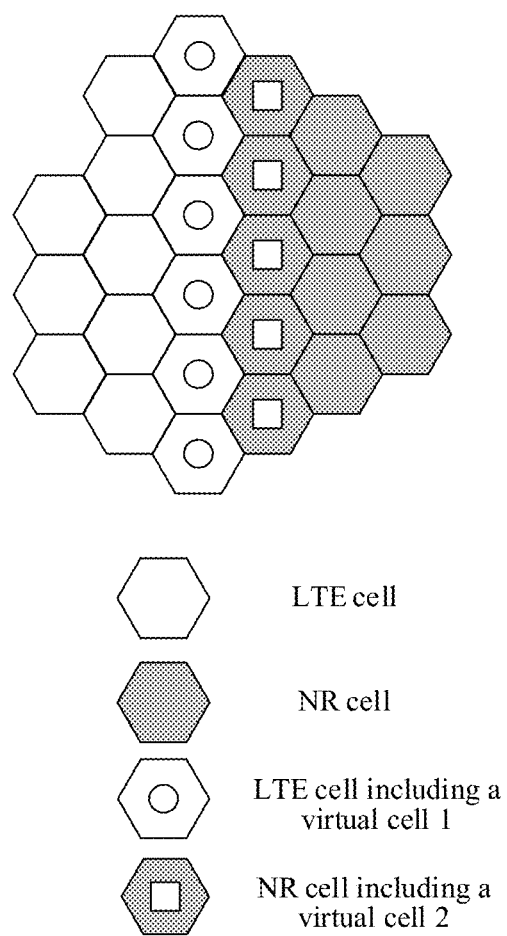

For the network architecture shown in FIG. 5, near-far interference is easily generated between a neighboring LTE cell and a neighboring NR cell. Therefore, a virtual cell 1 may be deployed in the LTE cell neighboring to the NR cell, and a communication standard of the virtual cell 1 is an NR communication standard. A virtual cell 2 is deployed in the NR cell neighboring to the LTE cell, and a communication standard of the virtual cell 2 is an LTE communication standard (where reference may be made to a network architecture shown in FIG. 18). In other words, for the virtual cell 1, the LTE cell neighboring to the NR cell may be considered as the second serving cell described in the foregoing content, and the NR cell neighboring to the LTE cell may be considered as the first serving cell described in the foregoing content. For the virtual cell 2, the LTE cell neighboring to the NR cell may be considered as the first serving cell described in the foregoing content, and the NR cell neighboring to the LTE cell may be considered as the second serving cell described in the foregoing content.

Figure 19:
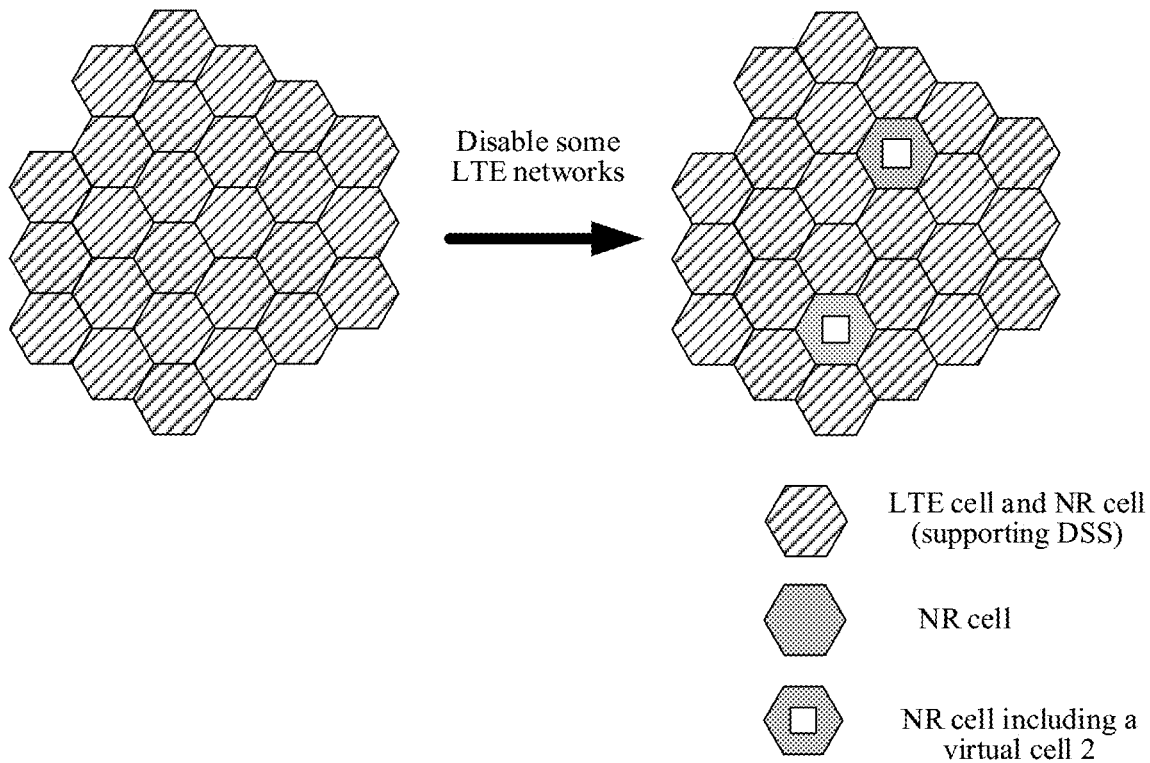

For the network architecture shown in FIG. 6A, near-far interference is easily generated between an NR cell and a neighboring LTE cell that supports DSS. Therefore, a virtual cell 2 (where reference may be made to a network architecture shown in FIG. 19) may be deployed in the NR cell neighboring to the LTE cell that supports the DSS, and a communication standard of the virtual cell 2 is an LTE communication standard. In other words, the NR cell neighboring to the LTE cell that supports the DSS may be considered as the second serving cell described in the foregoing content, and the LTE cell that supports the DSS and that is neighboring to the NR cell may be considered as the first serving cell described in the foregoing content.

Figure 20:
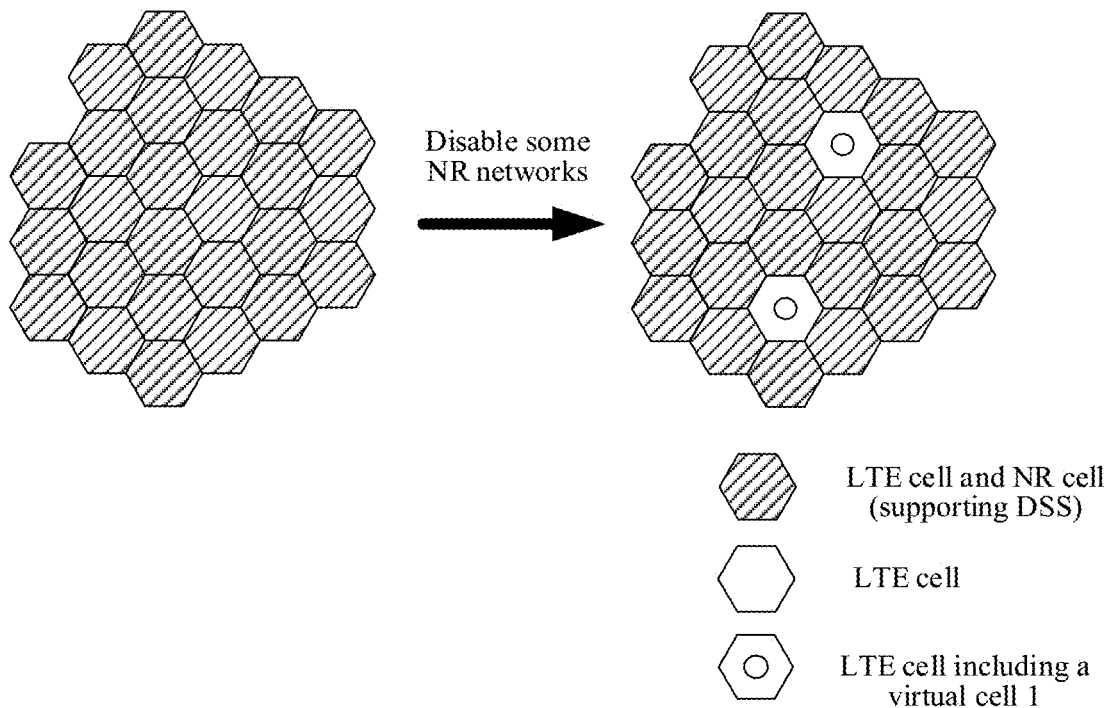

For the network architecture shown in FIG. 6B, near-far interference is easily generated between an LTE cell and a neighboring NR cell that supports DSS. Therefore, a virtual cell 1 (where reference may be made to a network architecture shown in FIG. 20) may be deployed in the LTE cell neighboring to the NR cell that supports the DSS, and a communication standard of the virtual cell 1 is an NR communication standard. In other words, the LTE cell neighboring to the NR cell that supports the DSS may be considered as the second serving cell described in the foregoing content, and the NR cell that supports the DSS and that is neighboring to the LTE cell may be considered as the first serving cell described in the foregoing content.

To implement functions in the foregoing methods provided in embodiments of this application, the first access network device and the second access network device may include a hardware structure and a software module, and implement the foregoing functions in a form of the hardware structure, the software module, or a combination of the hardware structure and the software module. One of the foregoing functions may be performed by using the hardware structure, the software module, or the combination of the hardware structure and the software module.

Figure 21:
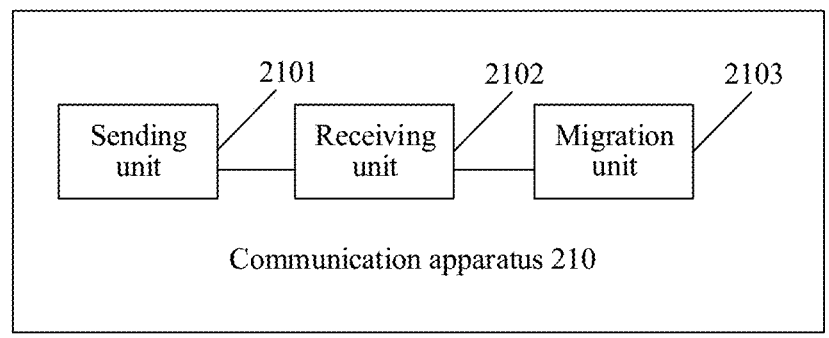
FIG. 21 is a schematic diagram of a communication apparatus according to an embodiment of this application.

FIG. 21 is a schematic diagram of a communication apparatus according to an embodiment of this application. A communication apparatus 210 may be an access network device, or may be an apparatus in the access network device, or may be an apparatus that can be used with a terminal device. The communication apparatus 210 includes a sending unit 2101, a receiving unit 2102, and a migration unit 2103. The sending unit 2101 is configured to send first measurement control information to a terminal device through a first serving cell. The first measurement control information indicates the terminal device to measure quality of a downlink reference signal of a virtual cell. A center frequency of a downlink reference signal of the first serving cell is the same as a center frequency of the downlink reference signal of the virtual cell. A frequency range of the virtual cell is included in a frequency range of a second serving cell, and the frequency range of the second serving cell overlaps with a frequency range of the first serving cell. A standard of the second serving cell is different from a standard of the first serving cell, or a standard of the second serving cell is the same as a standard of the first serving cell and a center frequency of a downlink reference signal of the second serving cell is different from the center frequency of the downlink reference signal of the first serving cell. The virtual cell and the second serving cell are cells of the communication apparatus, or the virtual cell and the second serving cell are cells of a second access network device. Specifically, for an operation performed by the sending unit 2101, refer to the descriptions in step S101 in the method shown in FIG. 10.

The receiving unit 2102 is configured to receive a first measurement report from the terminal device, where the first measurement report indicates the quality of the downlink reference signal of the virtual cell. Specifically, for an operation performed by the receiving unit 2102, refer to the descriptions in step S105 in the method shown in FIG. 10.

The migration unit 2103 is configured to migrate the terminal device to a third serving cell when the quality of the downlink reference signal of the virtual cell is higher than quality of the downlink reference signal of the first serving cell. A standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell. Specifically, for an operation performed by the migration unit 2103, refer to the descriptions in step S106 in the method shown in FIG. 10.

In some embodiments, the migration unit 2103 is specifically configured to: send second measurement control information to the terminal device, where the second measurement control information indicates the terminal device to measure quality of the downlink reference signal of the third serving cell; receive a second measurement report from the terminal device, where the second measurement report indicates the quality of the downlink reference signal of the third serving cell; and migrate the terminal device to the third serving cell based on the second measurement report.

In some embodiments, the communication apparatus stores one or more cell identifiers of one or more serving cells neighboring to the first serving cell. The cell identifiers of the one or more serving cells include a cell identifier of the third serving cell. The migration unit 2103 is specifically configured to: select the third serving cell from the one or more stored serving cells neighboring to the first serving cell; and migrate the terminal device to the third serving cell.

In some embodiments, the communication apparatus stores a cell identifier of the virtual cell, and a first measurement result includes the cell identifier of the virtual cell.

In some embodiments, the communication apparatus stores the cell identifiers of the one or more serving cells neighboring to the first serving cell, a first measurement result includes a cell identifier of the virtual cell, and the cell identifier of the virtual cell is different from the cell identifiers of the one or more serving cells.

In some embodiments, the virtual cell does not provide an access service for the terminal device.

In some embodiments, that a standard of the second serving cell is different from a standard of the first serving cell includes: The standard supported by the first serving cell is a long term evolution LTE standard, and the standard supported by the second serving cell is a new radio NR standard; or the standard supported by the first serving cell is an NR standard, and the standard supported by the second serving cell is an LTE standard.

In some embodiments, the virtual cell and the second serving cell are the cells of the communication apparatus, and the sending unit 2101 is further configured to send a downlink signal of the virtual cell, where the downlink signal includes the downlink reference signal of the virtual cell.

In some embodiments, the downlink reference signal includes a cell-specific reference signal CRS.

In some embodiments, the downlink signal further includes one or more of a PSS, an SSS, and a system information block, and the system information block includes indication information indicating that the virtual cell does not provide an access service for the terminal device.

In some embodiments, the downlink reference signal is a DMRS, the downlink signal is an SSB, and the SSB includes the DMRS.

In some embodiments, the sending unit 2101 is further configured to send, through the second serving cell, indication information to a terminal device accessing the second serving cell. The indication information indicates an available time-frequency resource of the terminal device accessing the second serving cell, and the available time-frequency resource is different from a time-frequency resource occupied by the downlink signal of the virtual cell or indicates that the terminal device accessing the second serving cell does not use a time-frequency resource occupied by the downlink signal sent by the virtual cell.

It should be noted that operations performed by the units of the communication apparatus shown in FIG. 21 may be the related content in the foregoing method embodiments. Details are not described herein again. The foregoing units may be implemented by hardware, software, or a combination of software and hardware. In an embodiment, functions of the sending unit 2101, the receiving unit 2102, and the migration unit 2103 in the foregoing content may be implemented by one or more processors in the communication apparatus 210.

The communication apparatus shown in FIG. 21 may determine, based on the first measurement report, that the quality of the downlink reference signal of the virtual cell is higher than the quality of the downlink reference signal of the first serving cell. In this case, near-far interference may be caused. In this case, the communication apparatus migrates the terminal device to the third serving cell, to avoid near-far interference to the terminal device.

Figure 22:
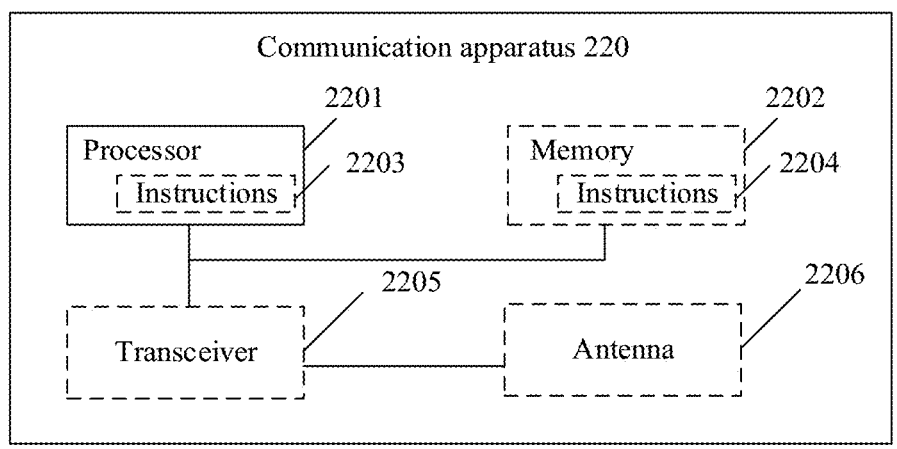
FIG. 22 is a schematic diagram of a structure of another communication apparatus according to an embodiment of this application.

FIG. 22 is a schematic diagram of a structure of another communication apparatus according to an embodiment of this application. A communication apparatus 220 may be an access network device, or may be an apparatus in the access network device, or may be an apparatus that can be used with a terminal device. Alternatively, the communication apparatus 220 may be a chip, a chip system, a processor, or the like that supports the access network device in implementing the foregoing method. The communication apparatus 220 may be configured to implement the method described in the foregoing method embodiments. For details, refer to the descriptions in the foregoing method embodiments.

The communication apparatus 220 may include one or more processors 2201. The processor 2201 may be a general-purpose processor, a dedicated processor, or the like. The processor 2201 may be configured to control the communication apparatus (for example, the access network device or the chip of the access network device), execute a software program, and process data of the software program.

Optionally, the communication apparatus 220 may include one or more memories 2202. The one or more memories 2202 may store instructions 2204. The instructions may be run on the processor 2201, to enable the communication apparatus 220 to perform the method described in the foregoing method embodiments. Optionally, the memory 2202 may further store data. The processor 2201 and the memory 2202 may be separately disposed, or may be integrated together.

Optionally, the communication apparatus 220 may further include a transceiver 2205 and an antenna 2206. The transceiver 2205 may be referred to as a transceiver unit, a transceiver machine, a transceiver circuit, or the like, and is configured to implement a transceiver function. The transceiver 2205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

In an implementation, the processor 2201 is further configured to perform the following operations.

The processor 2201 is configured to send, by using the transceiver 2205, first measurement control information to a terminal device through a first serving cell. The first measurement control information indicates the terminal device to measure quality of a downlink reference signal of a virtual cell. A center frequency of a downlink reference signal of the first serving cell is the same as a center frequency of the downlink reference signal of the virtual cell. A frequency range of the virtual cell is included in a frequency range of a second serving cell, and the frequency range of the second serving cell overlaps with a frequency range of the first serving cell. A standard of the second serving cell is different from a standard of the first serving cell, or a standard of the second serving cell is the same as a standard of the first serving cell and a center frequency of a downlink reference signal of the second serving cell is different from the center frequency of the downlink reference signal of the first serving cell. The virtual cell and the second serving cell are cells of the communication apparatus, or the virtual cell and the second serving cell are cells of a second access network device.

The processor 2201 is configured to receive, by using the transceiver 2205, a first measurement report from the terminal device, where the first measurement report indicates the quality of the downlink reference signal of the virtual cell.

The processor 2201 is configured to migrate the terminal device to a third serving cell when the quality of the downlink reference signal of the virtual cell is higher than quality of the downlink reference signal of the first serving cell. A standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell.

The operations performed by the processor 2201 may be the related content in the foregoing method embodiments. Details are not described herein again.

In another possible design, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In another possible design, optionally, the processor 2201 may store instructions 2203. When the instructions 2203 are executed on the processor 2201, the communication apparatus 220 is enabled to perform the method described in the foregoing method embodiments. The instructions 2203 may be fixed in the processor 2201. In this case, the processor 2201 may be implemented by hardware.

In another possible design, the communication apparatus 220 may include a circuit. The circuit may implement a sending, receiving, or communication function in the foregoing method embodiments.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like.

The communication apparatus described in the foregoing embodiments may be an access point or a station. However, a scope of the communication apparatus described in this application is not limited thereto, and a structure of the communication apparatus may not be limited by FIG. 22. The communication apparatus may be an independent device or may be a part of a large device. For example, the communication apparatus may be:

(1) an independent integrated circuit IC, a chip, or a chip system or subsystem;

(2) a set of one or more ICs, where optionally, the IC set may also include a storage component configured to store data and instructions;

(3) an ASIC such as a modem;

(4) a module that can be embedded in another device;

(5) a receiver, an intelligent terminal, a wireless device, a handheld device, a mobile unit, a vehicle-mounted device, a cloud device, an artificial intelligence device, and the like; and (6) others.

Figure 23:
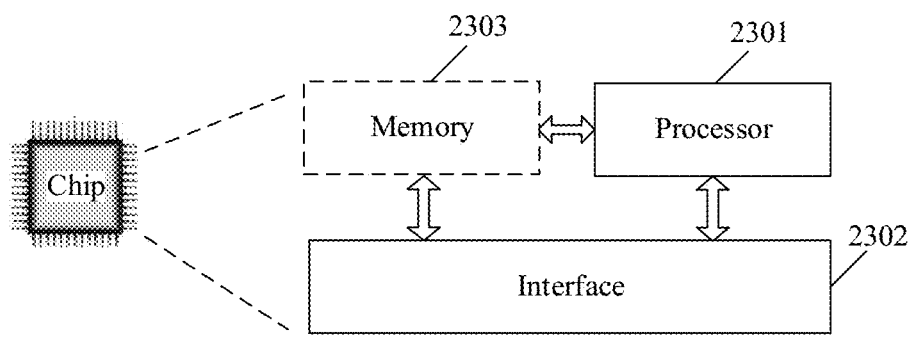
FIG. 23 is a schematic diagram of a structure of a chip according to an embodiment of this application.

For a case in which the communication apparatus may be the chip or the chip system, refer to a schematic diagram of a structure of a chip shown in FIG. 23. A chip 2300 shown in FIG. 23 includes a processor 2301 and an interface 2302. There may be one or more processors 2301, and there may be a plurality of interfaces 2302.

The chip is configured to implement a function of the first access network device in embodiments of this application.

The interface 2302 is configured to send first measurement control information to a terminal device through a first serving cell. The first measurement control information indicates the terminal device to measure quality of a downlink reference signal of a virtual cell. A center frequency of a downlink reference signal of the first serving cell is the same as a center frequency of the downlink reference signal of the virtual cell. A frequency range of the virtual cell is included in a frequency range of a second serving cell, and the frequency range of the second serving cell overlaps with a frequency range of the first serving cell. A standard of the second serving cell is different from a standard of the first serving cell, or a standard of the second serving cell is the same as a standard of the first serving cell and a center frequency of a downlink reference signal of the second serving cell is different from the center frequency of the downlink reference signal of the first serving cell. The virtual cell and the second serving cell are cells of the first access network device, or the virtual cell and the second serving cell are cells of a second access network device.

The interface 2302 receives a first measurement report from the terminal device, where the first measurement report indicates the quality of the downlink reference signal of the virtual cell.

The processor 2301 is configured to migrate the terminal device to a third serving cell when the quality of the downlink reference signal of the virtual cell is higher than quality of the downlink reference signal of the first serving cell. A standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell.

Optionally, the chip further includes a memory 2303, and the memory 2303 is configured to store program instructions and data that are necessary for the communication apparatus.

A person skilled in the art may further understand that various illustrative logical blocks and steps that are listed in embodiments of this application may be implemented by using electronic hardware, computer software, or a combination thereof. Whether a function is implemented by using hardware or software depends on particular applications and a design requirement of an entire system. A person skilled in the art may use various methods to implement the described function for each particular application, but it should not be considered that the implementation goes beyond the scope of embodiments of this application.

This application further provides a computer-readable storage medium storing a computer program. When the computer-readable storage medium is executed by a computer, the function in any one of the foregoing method embodiments is implemented.

This application further provides a computer program product. When the computer program product is executed by a computer, functions of any one of the foregoing method embodiments are implemented.

All or a part of the foregoing embodiments may be implemented by software, hardware, firmware, or any combination thereof. When software is used to implement the foregoing embodiments, all or a part of the foregoing embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

A person of ordinary skill in the art may understand that various numerals such as "first" and "second" in this application are merely used for differentiation for ease of description, and are not used to limit the scope or a sequence of embodiments of this application.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, a hash list, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether a function is performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cell measurement method comprising:
sending, by a first access network device, first measurement control information to a terminal device through a first serving cell, wherein the first measurement control information indicates the terminal device to measure quality of a downlink reference signal of a virtual cell, a center frequency of a downlink reference signal of the first serving cell is the same as a center frequency of the downlink reference signal of the virtual cell, a frequency range of the virtual cell is comprised in a frequency range of a second serving cell, and the frequency range of the second serving cell overlaps with a frequency range of the first serving cell;
receiving, by the first access network device, a first measurement report from the terminal device, wherein the first measurement report indicates the quality of the downlink reference signal of the virtual cell; and
migrating, by the first access network device, the terminal device to a third serving cell based on the quality of the downlink reference signal of the virtual cell being higher than quality of the downlink reference signal of the first serving cell, wherein
a standard of the second serving cell is different from a standard of the first serving cell, or the standard of the second serving cell is the same as the standard of the first serving cell and a center frequency of a downlink reference signal of the second serving cell is different from the center frequency of the downlink reference signal of the first serving cell;

the virtual cell and the second serving cell are cells of the first access network device, or the virtual cell and the second serving cell are cells of a second access network device; and a standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell.

2. The method according to claim 1, wherein the migrating, by the first access network device, the terminal device to the third serving cell comprises:

sending, by the first access network device, second measurement control information to the terminal device, wherein the second measurement control information indicates the terminal device to measure quality of the downlink reference signal of the third serving cell;

receiving, by the first access network device, a second measurement report from the terminal device, wherein the second measurement report indicates the quality of the downlink reference signal of the third serving cell; and migrating, by the first access network device, the terminal device to the third serving cell based on the second measurement report.

3. The method according to claim 1, wherein the first access network device stores one or more cell identifiers of one or more serving cells neighboring to the first serving cell, the cell identifiers of the one or more serving cells comprise a cell identifier of the third serving cell, and the migrating, by the first access network device, the terminal device to the third serving cell comprises:

selecting, by the first access network device, the third serving cell from the one or more stored serving cells neighboring to the first serving cell; and migrating, by the first access network device, the terminal device to the third serving cell.

4. The method according to claim 1, wherein the first access network device stores a cell identifier of the virtual cell, and a first measurement result comprises the cell identifier of the virtual cell.

5. The method according to claim 1, wherein the first access network device stores the cell identifiers of the one or more serving cells neighboring to the first serving cell, a first measurement result comprises a cell identifier of the virtual cell, and the cell identifier of the virtual cell is different from the cell identifiers of the one or more serving cells.

6. The method according to claim 1, wherein the virtual cell does not provide an access service for the terminal device.

7. The method according to claim 1, wherein that the standard of the second serving cell is different from the standard of the first serving cell comprises:

the standard supported by the first serving cell is a long term evolution (LTE) standard, and the standard supported by the second serving cell is a new radio (NR) standard; or the standard supported by the first serving cell is an NR standard, and the standard supported by the second serving cell is an LTE standard.

8. The method according to claim 1, wherein the virtual cell and the second serving cell are the cells of the first access network device, and the method further comprises:

sending, by the first access network device, a downlink signal of the virtual cell, wherein the downlink signal comprises the downlink reference signal of the virtual cell.

9. The method according to claim 8, wherein the downlink reference signal comprises a cell-specific reference signal (CRS).

10. The method according to claim 9, wherein the downlink signal further comprises one or more of a primary synchronization signal (PSS), a secondary synchronization signal (SSS), and a system information block, and the system information block comprises indication information indicating that the virtual cell does not provide an access service for the terminal device.

11. The method according to claim 8, wherein the downlink reference signal is a demodulation reference signal (DMRS), the downlink signal is a synchronization signal and physical broadcast channel block (SSB), and the SSB comprises the DMRS.

12. The method according to claim 8, further comprising:

sending, by the first access network device through the second serving cell, indication information to a terminal device accessing the second serving cell, wherein the indication information indicates an available time-frequency resource of the terminal device accessing the second serving cell, and the available time-frequency resource is different from a time-frequency resource occupied by the downlink signal of the virtual cell or indicates that the terminal device accessing the second serving cell does not use a time-frequency resource occupied by the downlink signal sent by the virtual cell.

13. A communication apparatus comprising:

a memory configured to store processor-executable instructions; and a processor configured to execute the processor-executable instructions to cause the apparatus to:

send first measurement control information to a terminal device through a first serving cell, wherein the first measurement control information indicates the terminal device to measure quality of a downlink reference signal of a virtual cell, a center frequency of a downlink reference signal of the first serving cell is the same as a center frequency of the downlink reference signal of the virtual cell, a frequency range of the virtual cell is comprised in a frequency range of a second serving cell, and the frequency range of the second serving cell overlaps with a frequency range of the first serving cell;

receive a first measurement report from the terminal device, wherein the first measurement report indicates the quality of the downlink reference signal of the virtual cell; and migrate the terminal device to a third serving cell based on the quality of the downlink reference signal of the virtual cell being higher than quality of the downlink reference signal of the first serving cell, wherein a standard of the second serving cell is different from a standard of the first serving cell, or the standard of the second serving cell is the same as the standard of the first serving cell and a center frequency of a downlink reference signal of the second serving cell is different from the center frequency of the downlink reference signal of the first serving cell;

the virtual cell and the second serving cell are cells of the communication apparatus, or the virtual cell and the second serving cell are cells of a second access network device; and a standard of the third serving cell is the same as the standard of the first serving cell, and a center frequency of a downlink reference signal of the third serving cell is different from the center frequency of the downlink reference signal of the first serving cell, or a standard of the third serving cell is different from the standard of the first serving cell.

14. The communication apparatus according to claim 13, wherein the processor is further configured to execute the processor-executable instructions to cause the apparatus to:
send second measurement control information to the terminal device, wherein the second measurement control information indicates the terminal device to measure quality of the downlink reference signal of the third serving cell;
receive a second measurement report from the terminal device, wherein the second measurement report indicates the quality of the downlink reference signal of the third serving cell; and
migrate the terminal device to the third serving cell based on the second measurement report.

15. The communication apparatus according to claim 13, wherein the communication apparatus stores one or more cell identifiers of one or more serving cells neighboring to the first serving cell, the cell identifiers of the one or more serving cells comprise a cell identifier of the third serving cell, and the processor is further configured to execute the processor-executable instructions to cause the apparatus to:
select the third serving cell from the one or more stored serving cells neighboring to the first serving cell; and
migrate the terminal device to the third serving cell.

16. The communication apparatus according to claim 13, wherein the communication apparatus stores a cell identifier of the virtual cell, and a first measurement result comprises the cell identifier of the virtual cell.

17. The communication apparatus according to claim 13, wherein the communication apparatus stores the cell identifiers of the one or more serving cells neighboring to the first serving cell, a first measurement result comprises a cell identifier of the virtual cell, and the cell identifier of the virtual cell is different from the cell identifiers of the one or more serving cells.

18. The communication apparatus according to claim 13, wherein the virtual cell does not provide an access service for the terminal device.

19. The communication apparatus according to claim 13, wherein that the standard of the second serving cell is different from the standard of the first serving cell comprises:
the standard supported by the first serving cell is a long term evolution (LTE) standard, and the standard supported by the second serving cell is a new radio (NR) standard; or the standard supported by the first serving cell is an NR standard, and the standard supported by the second serving cell is an LTE standard.

20. The communication apparatus according to claim 13, wherein the virtual cell and the second serving cell are the cells of the communication apparatus, and the processor is further configured to execute the processor-executable instructions to cause the apparatus to:
send a downlink signal of the virtual cell, wherein the downlink signal comprises the downlink reference signal of the virtual cell.

* * * * *